(12) United States Patent
Song et al.

(10) Patent No.: US 11,764,372 B2
(45) Date of Patent: Sep. 19, 2023

(54) SOLID OXIDE FUEL CELL POWER GENERATION SYSTEM

(71) Applicant: InGineers, Gimhae-si (KR)

(72) Inventors: Chang Kyu Song, Gimhae-si (KR); Mun Kyoung Choi, Gimhae-si (KR); Sun Jin Kim, Busan (KR)

(73) Assignee: INGINEERS, Gimhae-si (KR)

( * ) Notice: Subject to any disclaimer, the term of this patent is extended or adjusted under 35 U.S.C. 154(b) by 104 days.

(21) Appl. No.: 17/511,839

(22) Filed: Oct. 27, 2021

(65) Prior Publication Data

US 2022/0216487 A1 Jul. 7, 2022

(30) Foreign Application Priority Data

Jan. 7, 2021 (KR) .................. 10-2021-0001858

(51) Int. Cl.
*H01M 8/04089* (2016.01)
*H01M 8/04014* (2016.01)
*H01M 8/1231* (2016.01)
*H01M 8/12* (2016.01)

(52) U.S. Cl.
CPC ... *H01M 8/04097* (2013.01); *H01M 8/04014* (2013.01); *H01M 8/1231* (2016.02); *H01M 2008/1293* (2013.01)

(58) Field of Classification Search
None
See application file for complete search history.

(56) References Cited

U.S. PATENT DOCUMENTS

| | | | | |
|---|---|---|---|---|
| 2003/0008184 | A1* | 1/2003 | Ballantine | H01M 8/04731 429/436 |
| 2005/0089731 | A1* | 4/2005 | Ogiwara | H01M 8/0612 422/198 |
| 2005/0163610 | A1* | 7/2005 | Higashimori | F04D 29/444 415/191 |
| 2006/0019139 | A1* | 1/2006 | Matsui | H01M 8/0625 429/429 |
| 2006/0144387 | A1* | 7/2006 | Sato | F04D 25/026 126/110 R |
| 2006/0251935 | A1* | 11/2006 | Barrett | H01M 8/04097 429/513 |

(Continued)

FOREIGN PATENT DOCUMENTS

| KR | 10-2005-0058327 A | 6/2005 |
|---|---|---|
| KR | 10-2012-0080881 A | 7/2012 |
| KR | 10-1364131 B1 | 2/2014 |

OTHER PUBLICATIONS

Korean Office Action for related KR Application No. 10-2021-0001858 dated Dec. 2, 2021 from Korean Intellectual Property Office.

(Continued)

*Primary Examiner* — Haroon S. Sheikh
(74) *Attorney, Agent, or Firm* — Paratus Law Group, PLLC

(57) ABSTRACT

Disclosed is a solid oxide fuel cell power generation system including: a fuel cell module; a blower for supplying a gaseous fuel to the fuel cell module; an air supplier for supplying air to the fuel cell module; and a fuel supplier for supplying the gaseous fuel to the blower. The blower recycles at least a portion of an unreacted gaseous fuel to the fuel cell module.

17 Claims, 21 Drawing Sheets

(56) References Cited

U.S. PATENT DOCUMENTS

| | | | | |
|---|---|---|---|---|
| 2007/0231628 A1* | 10/2007 | Lyle | ............... | H01M 8/04231 |
| | | | | 429/444 |
| 2009/0258256 A1* | 10/2009 | Limbeck | ........... | H01M 8/04225 |
| | | | | 429/429 |
| 2014/0220464 A1* | 8/2014 | Ogawa | ............. | H01M 8/04067 |
| | | | | 429/425 |
| 2014/0322621 A1* | 10/2014 | Patel | ................ | H01M 8/04201 |
| | | | | 429/415 |
| 2020/0168922 A1* | 5/2020 | Weingaertner | .... | H01M 8/04761 |

OTHER PUBLICATIONS

Korean Notice of Allowance for related KR Application No. 10-2021-0001858 dated Jan. 5, 2022 from Korean Intellectual Property Office.

* cited by examiner

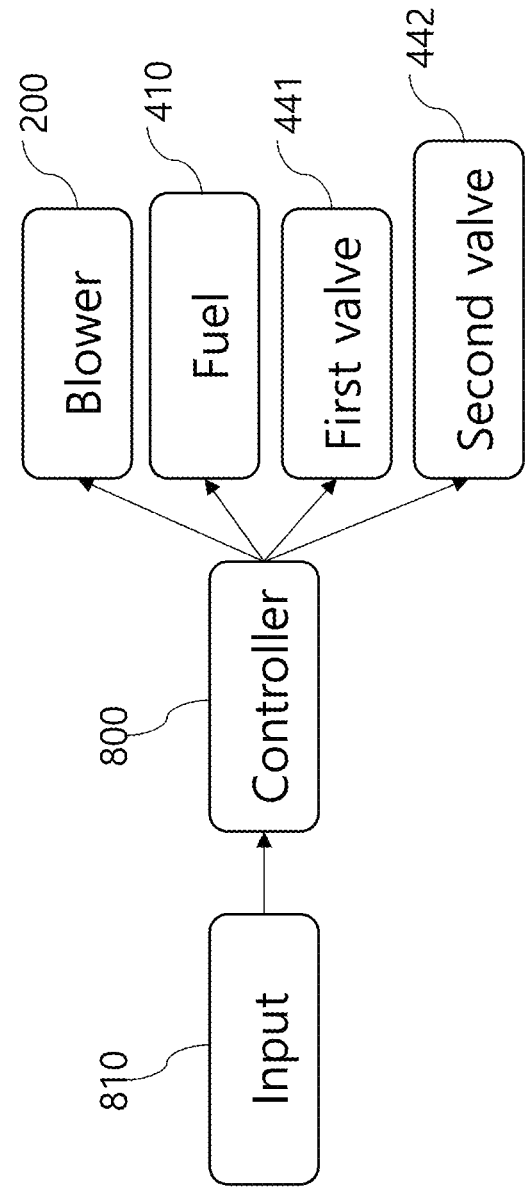

FIG. 8

$$V_N = \underbrace{\frac{-\Delta G^o(T_{SOFC})}{2 \times F}}_{E_0} + \frac{R_g \times T_{ave,SOFC}}{2 \times F} \times \ln\left(\frac{P_{H_2}}{P_{H_2O}}\sqrt{P_{O_2}}\right)$$

$P_{H_2} = y_{H_2,a} \times P_{Op.}$
$P_{H_2O} = y_{H_2O,a} \times P_{Op.}$
$P_{O_2} = y_{O_2,c} \times P_{Op.}$

- Nomenclature

F: Faraday Constant, 96485 C/mol
P: pressure or partial pressure, atm
Rg: universal gas constant, 8.314 J/(mol K)
ΔG: change in Gibbs Free Energy, J/mol
T: temperature, K
V: terminal voltage, V

- Subscripts a: anode
act: activation polarization
c: cathode
con: concentration polarization
ohm: ohmic polarization
Op: operating

FIG. 9

$$V_{act} = V_{act,a} + V_{act,c}$$

$$V_{act,a} = \frac{R_g \times T_{FC,exit}}{F} \times \ln\left[\frac{j}{2 \times j_{0,a}} + \left\{\left(\frac{j}{2 \times j_{0,a}}\right)^2 + 1\right\}^{0.5}\right], \quad j_{0,a} = \gamma_a \times y_{H_2,TPB} \times y_{H_2O,TPB} \times \exp\left(\frac{-E_{act,a}}{R_g \times T_{FC,exit}}\right)$$

$$V_{act,c} = \frac{R_g \times T_{FC,exit}}{F} \times \ln\left[\frac{j}{2 \times j_{0,c}} + \left\{\left(\frac{j}{2 \times j_{0,c}}\right)^2 + 1\right\}^{0.5}\right], \quad j_{0,c} = \gamma_c \times (y_{O_2,TPB})^{0.25} \times \exp\left(\frac{-E_{act,c}}{R_g \times T_{FC,exit}}\right)$$

$$y_{O_2,TPB} = \frac{1}{\delta_{O_2}} + \left[\left(y_{O_2} - \frac{1}{\delta_{O_2}}\right) \times \exp\left(\frac{R_g \times T_{FC,exit} \times j \times \delta_{O_2} \times d_c}{4 \times F \times P_{O_2} \times D_{\alpha,\beta}^{eff}}\right)\right], \quad D_{\alpha,\beta}^{eff} = D_{\alpha,\beta} \times \frac{\varepsilon}{\tau}, \quad D_{\alpha,\beta} = \frac{0.00143 \times T_{FC,exit}^{1.75}}{P_{O_2} \times \sqrt{M_{\alpha,\beta}} \times \left[(\Sigma_\nu)_\alpha^{\frac{1}{3}} + (\Sigma_\nu)_\beta^{\frac{1}{3}}\right]^2}$$

$$y_{H_2,TPB} = y_{H_2} + \left[\left(\frac{R_g \times T_{FC,exit} \times j}{2 \times F \times P_{H_2}}\right) \times \left(\frac{1}{D_{K,H_2}^{eff}} + \frac{1}{D_{H_2,H_2O}^{eff}}\right) \times d_a\right], \quad D_{K,\alpha}^{eff} = D_{K,\alpha} \times \frac{\varepsilon}{\tau}, \quad D_{K,\alpha} = \frac{2}{3} \times r_p \times \sqrt{\frac{8 \times R_g \times T_{FC,exit}}{\pi \times M_\alpha}}$$

$$y_{H_2O,TPB} = y_{H_2O} + \left[\left(\frac{R_g \times T_{FC,exit} \times j}{2 \times F \times P_{H_2O}}\right) \times \left(\frac{1}{D_{K,H_2O}^{eff}} + \frac{1}{D_{H_2O,H_2}^{eff}}\right) \times d_a\right], \quad M_{\alpha,\beta} = 2 \times \left[\frac{1}{M_\alpha} + \frac{1}{M_\beta}\right]^{-1}, \quad \delta_{O_2} = \left(\frac{D_{K,O_2}^{eff}}{D_{K,O_2}^{eff} + D_{O_2,N_2}^{eff}}\right)$$

FIG. 10

$$V_{ohm} = j \times \sum R_i = j \times [\rho_i \times \delta_i] = j \times [(\rho_a \times \delta_a) + (\rho_e \times \delta_e) + (\rho_c \times \delta_c) + (\rho_{int} \times \delta_{int})]$$

Table. Bossel constant parameters and thickness for common SOFC materials

| SOFC segments | Ohmic loss coefficients | | Thickness (mm) | Material resistivity according to Bossel equations (Electrical conductivity of SOFC segments) |
| --- | --- | --- | --- | --- |
| | C1 | C2 | | |
| Anode | 9.35E+7 | -1150 | 0.66 | $\rho_a = \left[ \dfrac{9.35E\text{-}07}{T_{FC,avg}} \times \exp\left(\dfrac{-1150}{T_{FC,avg}}\right) \right]^{-1}$ |
| Electrolyte | 3.34E+7 | -10300 | 0.03 | $\rho_e = \left[ \dfrac{3.34E\text{-}04}{T_{FC,avg}} \times \exp\left(\dfrac{-10300}{T_{FC,avg}}\right) \right]^{-1}$ |
| Cathode | 4.2E+7 | -1200 | 0.02 | $\rho_c = \left[ \dfrac{4.2E\text{-}07}{T_{FC,avg}} \times \exp\left(\dfrac{-1200}{T_{FC,avg}}\right) \right]^{-1}$ |
| Interconnector | 9.34E+4 | -1100 | 1.14 | $\rho_{int} = \left[ \dfrac{9.34E\text{-}07}{T_{FC,avg}} \times \exp\left(\dfrac{-1100}{T_{FC,avg}}\right) \right]^{-1}$ |

FIG. 11

$$V_{act} = V_{act,a} + V_{act,c}$$

$$V_{act,a} = \frac{R_g \times T_{FC,exit}}{2 \times F} \times \ln\left(\frac{y_{H_2} \times y_{H_2O,TPB}}{y_{H_2,TPB} \times y_{H_2O}}\right)$$

$$V_{act,c} = \frac{R_g \times T_{FC,exit}}{4 \times F} \times \ln\left(\frac{y_{O_2}}{y_{O_2,TPB}}\right)$$

$$y_{O_2,TPB} = \frac{1}{\delta_{O_2}} + \left[\left(y_{O_2} - \frac{1}{\delta_{O_2}}\right) \times \exp\left(\frac{R_g \times T_{FC,exit} \times j \times \delta_{O_2} \times d_c}{4 \times F \times P_{O_2} \times D_{\alpha,\beta}^{eff}}\right)\right]$$

$$D_{\alpha,\beta} = \frac{0.00143 \times T_{FC,exit}^{1.75}}{P_{O_2} \times \sqrt{M_{\alpha,\beta}} \times \left[(\Sigma_V)_\alpha^{\frac{1}{3}} + (\Sigma_V)_\beta^{\frac{1}{3}}\right]^2}$$

$$D_{\alpha,\beta}^{eff} = D_{\alpha,\beta} \times \frac{\varepsilon}{\tau}$$

$$y_{H_2,TPB} = y_{H_2} + \left[\left(\frac{R_g \times T_{FC,exit} \times j}{2 \times F \times P_{H_2}}\right) \times \left(\frac{1}{D_{K,H_2}^{eff}} + \frac{1}{D_{H_2,H_2O}^{eff}}\right) \times d_a\right]$$

$$D_{K,\alpha}^{eff} = D_{K,\alpha} \times \frac{\varepsilon}{\tau}$$

$$D_{K,\alpha} = \frac{2}{3} \times r_p \times \sqrt{\frac{8 \times R_g \times T_{FC,exit}}{\pi \times M_\alpha}}$$

$$y_{H_2O,TPB} = y_{H_2O} + \left[\left(\frac{R_g \times T_{FC,exit} \times j}{2 \times F \times P_{H_2O}}\right) \times \left(\frac{1}{D_{K,H_2O}^{eff}} + \frac{1}{D_{H_2O,H_2}^{eff}}\right) \times d_a\right]$$

$$M_{\alpha,\beta} = 2 \times \left[\frac{1}{M_\alpha} + \frac{1}{M_\beta}\right]^{-1}$$

$$\delta_{O_2} = \frac{D_{K,O_2}^{eff}}{D_{K,O_2}^{eff} + D_{O_2,N_2}^{eff}}$$

FIG. 12

| Control Logic | Properties | Symbol | Unit |
|---|---|---|---|
| a. Input | Required mass flowrate | $Q_{m,r}$ | g/s |
| b. Sensor Signal | Ambient Temperature | $T_a$ | K |
| | Ambient Pressure | $P_a$ | kPa |
| | ARB inlet temperature | $T_i$ | K |
| | ARB inlet pressure | $P_i$ | kPa |
| | ARB outlet temperature | $T_o$ | K |
| | ARB outlet pressure | $P_o$ | kPa |
| | Rotating Speed | N | RPM |
| | Wire temperature in motor | $T_m$ | K |
| | Power consumption | $W_{sys}$ | W |
| c. Constant | Required % error | $err_{REQ}$ | % |
| | Gas Constant | R | J/kg/K |
| | Heat capacity ratio | γ | - |
| | Inner diameter of outlet diameter | $D_i$ | mm |
| | Outler diameter of outlet diameter | $D_o$ | mm |
| | Reference massflowrate | $Q_{m,ref}$ | g/s |
| | Min. rotating speed | $N_{min}$ | RPM |
| | Max. rotating speed | $N_{max}$ | RPM |
| | Control Gain | $Q_N$ | - |
| d. Lookup table Conversion | N(RPM) conversion | | - |
| | $Q_m$(g/s) converstion | | - |
| | Pr(-) conversion | | - |
| e. Limit | $T_m < T_{m,limit}$ | $T_{m,limit}$ | K |
| | $W_m < W_{m,limit}$ | $W_{m,limit}$ | W |
| | Ref. Corrected mass flowrate | $Q_{m,ref,cor}$ | g/s |
| | Min. massflowrate | $Q_{m,min}$ | g/s |
| | Max. massflowrate | $Q_{m,max}$ | g/s |
| | Min. rotating speed | $N_{min}$ | RPM |
| | Max. rotating speed | $N_{max}$ | RPM |
| | Max. inlet temperature | $T_{i,max}$ | K |
| f. Calculation | Required total pressure ratio | $Pr_r$ | - |
| | Current mass flowrate | $Q_{m,cur}$ | g/s |
| | Inlet density | $\rho_i$ | kg/m³ |
| | Outlet density | $\rho_o$ | kg/m³ |
| | Inlet velocity | $V_i$ | m/s |
| | Outlet velocity | $V_o$ | m/s |
| | Inlet total pressure | $P_{i,tot}$ | kPa |
| | Outlet total pressure | $P_{o,tot}$ | kPa |
| | Current total pressure ratio | $Pr_{cur}$ | - |
| g. Output | Required ΔN | ΔN | RPM |
| h. Control Logic | If %err < $err_{REQ}$ --> Stop | %err<$err_{REQ}$ | % |

FIG. 13

| Properties | Symbol | Unit | Value | Remark |
|---|---|---|---|---|
| Gas Constant | R | J/kg/K | 363.2 | |
| Heat capacity ratio | γ | - | 1.2606 | |
| Inner diameter of outlet diameter | $D_i$ | mm | 22 | |
| Outer diameter of outlet diameter | $D_o$ | mm | 24 | |
| Reference mass flowrate | $Q_{m,ref}$ | g/s | 3.197 | 550°C, Mixture |
| Min. rotating speed | $N_{min,ref}$ | RPM | 110000 | 550°C, Mixture |
| Max. rotating speed | $N_{max,ref}$ | RPM | 156000 | 550°C, Mixture |
| Control Gain - N | $Q_N$ | - | 0.0005 | |

FIG. 14

| x1(RPM) | x2(g/s) | x3(-) | | N(RPM) | Qm(g/s) | Pr(-) |
|---|---|---|---|---|---|---|
| 182.50135 | 7.7856982 | 1.0584007 | → | 112038.47 | 1.6199083 | 1.0584007 |
| 182.50135 | 9.4106788 | 1.0569815 | → | 112038.47 | 1.958005 | 1.0569815 |
| 182.50135 | 11.271319 | 1.0549595 | → | 112038.47 | 2.3451337 | 1.0549595 |
| 182.50135 | 12.669847 | 1.0532129 | → | 112038.47 | 2.6361141 | 1.0532129 |
| 182.50135 | 14.443032 | 1.0512991 | → | 112038.47 | 3.0050467 | 1.0512991 |
| 182.50135 | 16.426735 | 1.0496798 | → | 112038.47 | 3.4177799 | 1.0496798 |
| 182.50135 | 18.077491 | 1.047547 | → | 112038.47 | 3.7612397 | 1.047547 |
| 182.50135 | 19.806927 | 1.0441197 | → | 112038.47 | 4.1210697 | 1.0441197 |
| 182.50135 | 21.267956 | 1.0408856 | → | 112038.47 | 4.4250544 | 1.0408856 |
| 182.50135 | 22.715888 | 1.0372213 | → | 112038.47 | 4.726314 | 1.0372213 |
| 205.31402 | 7.7355601 | 1.0762506 | → | 126043.27 | 1.6094764 | 1.0762506 |
| 205.31402 | 9.6564147 | 1.0731938 | → | 126043.27 | 2.0091333 | 1.0731938 |
| 205.31402 | 11.606429 | 1.0712051 | → | 126043.27 | 2.4148574 | 1.0712051 |
| 205.31402 | 13.575595 | 1.0683628 | → | 126043.27 | 2.8245659 | 1.0683628 |
| 205.31402 | 15.728855 | 1.0657961 | → | 126043.27 | 3.2725777 | 1.0657961 |
| 205.31402 | 17.66706 | 1.0638511 | → | 126043.27 | 3.6758446 | 1.0638511 |
| 205.31402 | 19.629179 | 1.0612658 | → | 126043.27 | 4.084087 | 1.0612658 |
| 205.31402 | 21.543133 | 1.057871 | → | 126043.27 | 4.4823082 | 1.057871 |
| 205.31402 | 23.422241 | 1.0531445 | → | 126043.27 | 4.8732792 | 1.0531445 |
| 205.31402 | 25.481198 | 1.0473369 | → | 126043.27 | 5.3016701 | 1.0473369 |
| 228.12669 | 7.724112 | 1.0967427 | → | 140048.08 | 1.6070945 | 1.0967427 |
| 228.12669 | 9.4707809 | 1.092586 | → | 140048.08 | 1.97051 | 1.092586 |
| 228.12669 | 11.82498 | 1.0894381 | → | 140048.08 | 2.4603295 | 1.0894381 |
| 228.12669 | 13.830184 | 1.0862204 | → | 140048.08 | 2.8775363 | 1.0862204 |
| 228.12669 | 16.144632 | 1.0831692 | → | 140048.08 | 3.3590851 | 1.0831692 |
| 228.12669 | 18.353406 | 1.080695 | → | 140048.08 | 3.8186471 | 1.080695 |
| 228.12669 | 20.172733 | 1.0783261 | → | 140048.08 | 4.1971799 | 1.0783261 |
| 228.12669 | 22.190664 | 1.0754843 | → | 140048.08 | 4.6170349 | 1.0754843 |
| 228.12669 | 24.06859 | 1.0708622 | → | 140048.08 | 5.0077599 | 1.0708622 |
| 228.12669 | 26.149591 | 1.065412 | → | 140048.08 | 5.4407373 | 1.065412 |
| 250.93936 | 7.7370087 | 1.1177367 | → | 154052.89 | 1.6097778 | 1.1177367 |
| 250.93936 | 9.7466812 | 1.1127985 | → | 154052.89 | 2.0279144 | 1.1127985 |
| 250.93936 | 11.845161 | 1.1096986 | → | 154052.89 | 2.4645283 | 1.1096986 |
| 250.93936 | 13.983105 | 1.1068422 | → | 154052.89 | 2.9093534 | 1.1068422 |
| 250.93936 | 15.875173 | 1.1029975 | → | 154052.89 | 3.303021 | 1.1029975 |
| 250.93936 | 18.040269 | 1.1002552 | → | 154052.89 | 3.7534952 | 1.1002552 |
| 250.93936 | 20.145145 | 1.09747 | → | 154052.89 | 4.19144 | 1.09747 |
| 250.93936 | 22.050245 | 1.0950647 | → | 154052.89 | 4.587819 | 1.0950647 |
| 250.93936 | 24.080825 | 1.0913585 | → | 154052.89 | 5.0103056 | 1.0913585 |
| 250.93936 | 26.005494 | 1.0867521 | → | 154052.89 | 5.4107561 | 1.0867521 |

FIG. 15

| Properties | Symbol | Unit | Value | Remark |
|---|---|---|---|---|
| $T_m < T_{m,limit}$ | $T_{m,limit}$ | K | 400 | Max. winding temperature |
| $W_m < W_{m,limit}$ | $W_{m,limit}$ | W | 500 | Max. motor power |
| Ref. Corrected mass flowrate | $Q_{m,ref,cor}$ | g/s | 3.197 | $= 2.850238 \cdot Q_{m,r} \ast \sqrt{P_i/T_i}$ |
| Min. massflowrate | $Q_{m,min}$ | g/s | 1.5985 | $= 0.5 \cdot Q_{m,ref,cor}$ |
| Max. massflowrate | $Q_{m,max}$ | g/s | 4.7955 | $= 1.5 \cdot Q_{m,ref,cor}$ |
| Min. rotating speed | $N_{min}$ | RPM | 110000 | $= N_{min,ref} \cdot \sqrt{T_i/823.15}$ |
| Max. rotating speed | $N_{max}$ | RPM | 156000 | $= N_{max,ref} \cdot \sqrt{T_i/823.15}$ |
| Max. Inlet temperature | $T_{i,max}$ | K | 873.15 | Up to inlet temperature of 600°C |

FIG. 17

| Properties | Symbol | Unit | Value | Remark |
|---|---|---|---|---|
| Required total pressure ratio | $Pr_r$ | - | 1.05 | $=f(N, Q_{m,r})$ from Lookup table |
| $Q_{m,cur}$ Assumption | $Q_{m,ass}$ | g/s | 2.8 | Initial Assumption |
| Inlet density | $\rho_i$ | kg/m³ | 0.338916 | |
| Outlet density | $\rho_o$ | kg/m³ | 0.346592 | |
| Inlet velocity | $V_i$ | m/s | 19.40497 | |
| Outlet velocity | $V_o$ | m/s | 15.94442 | |
| Inlet total pressure | $P_{i,tot}$ | kPa | 101.3888 | |
| Outlet total pressure | $P_{o,tot}$ | kPa | 107.0441 | |
| Current total pressure ratio | $Pr_{cur}$ | - | 1.055778 | $=f(N, Pr_{cur})$ from Lookup table |
| Current mass flowrate | $Q_{m,cur}$ | g/s | 2.5 | Repeated calculation until error range is satisfied |
| $Q_{m,ass} - Q_{m,cur} < \%err$ | | | | |

FIG. 18
(a)
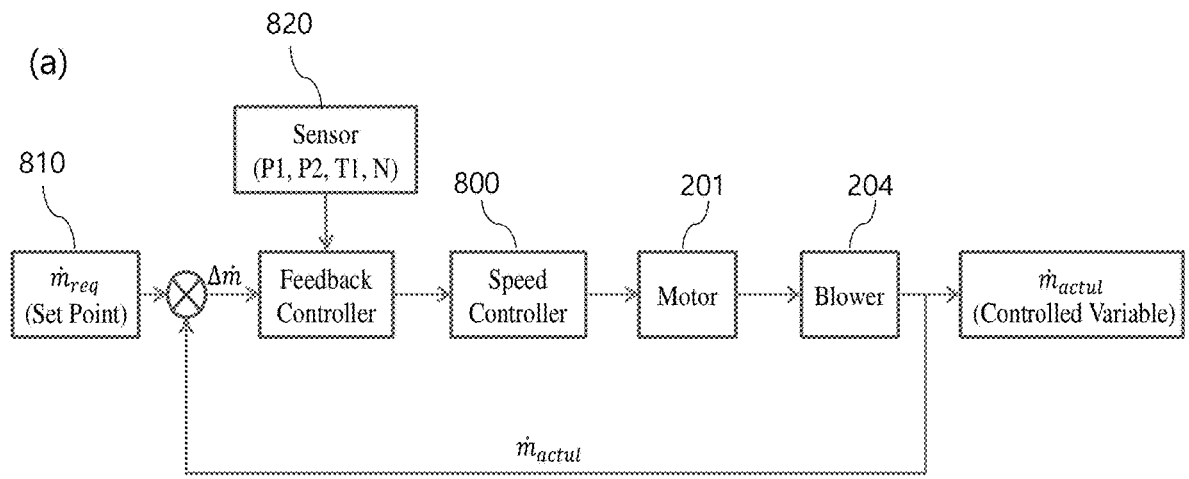
(b)
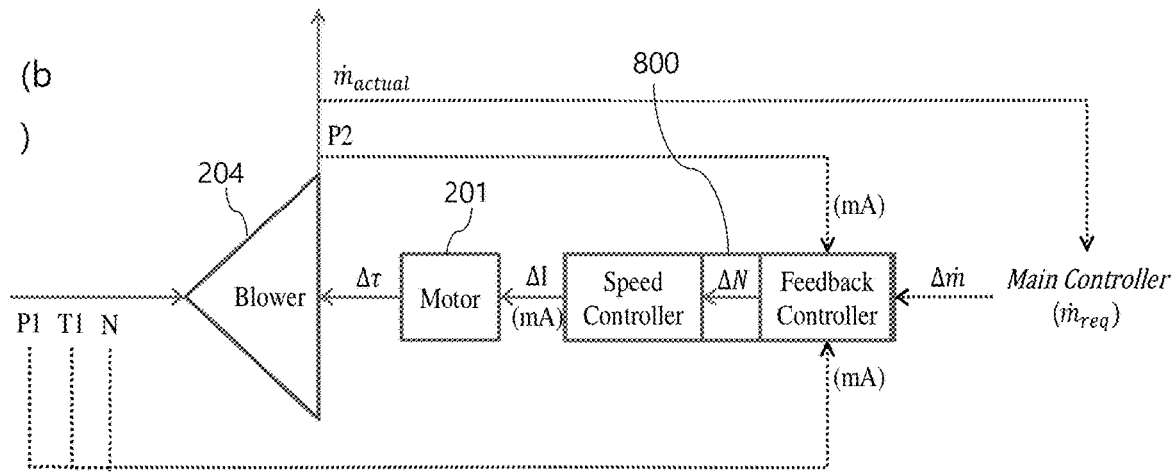
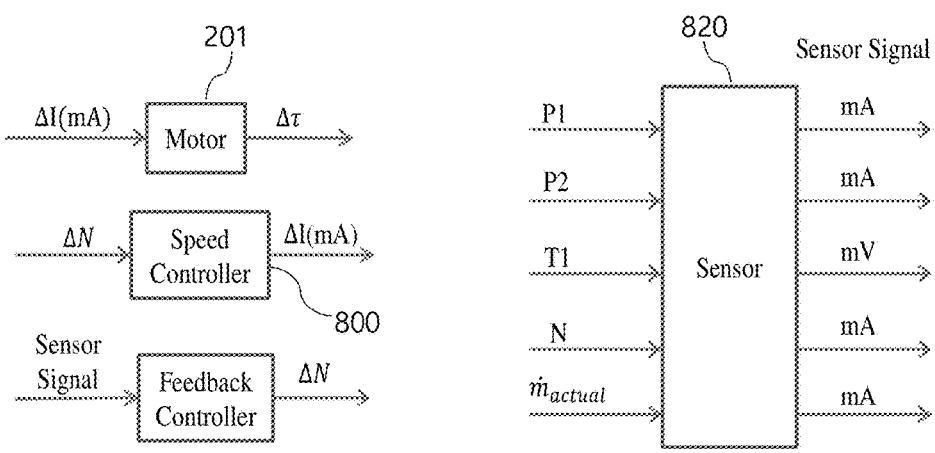

FIG. 20
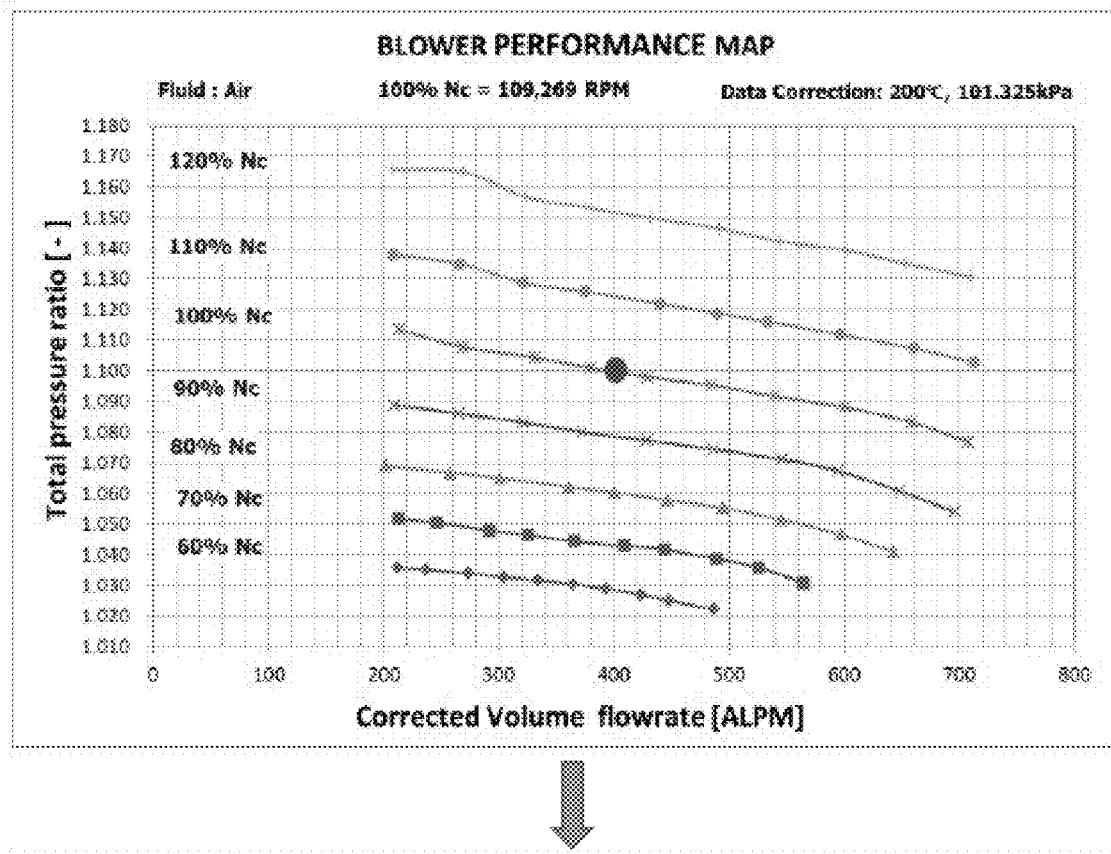
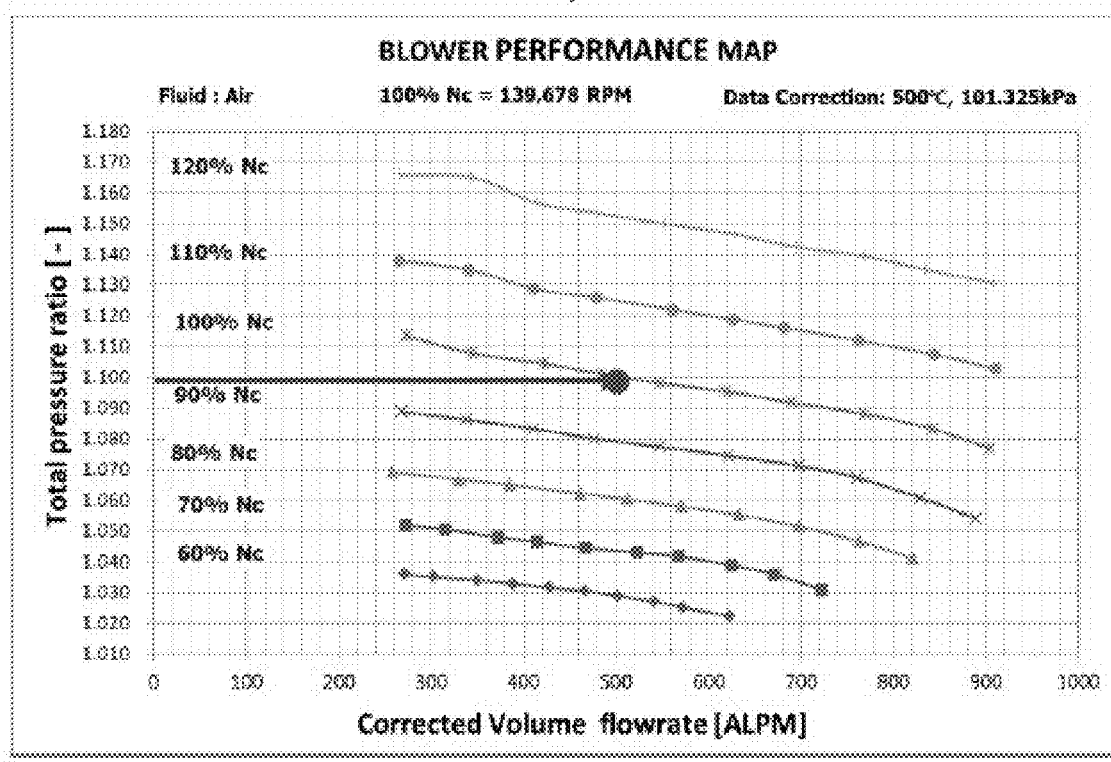

SOLID OXIDE FUEL CELL POWER GENERATION SYSTEM

CROSS REFERENCE TO PRIOR APPLICATION

This application claims priority to Korean Patent Application No. 10-2021-0001858 (filed on Jan. 7, 2021), which is hereby incorporated by reference in its entirety.

BACKGROUND

The present invention relates to a solid oxide fuel cell (SOFC) power generation system using a chemical reaction, and more particularly, to a high-temperature solid oxide fuel cell power generation system that is capable of being installed on a place such as a desert where it is not easy to supply water to improve a power generation efficiency by means of air bearing supports and air cooling and capable of controlling a recycling flow rate in real time by means of an ambient temperature performance map and measured data for a temperature and pressure at a high-temperature operating point to thus enhance high power generation efficiency thereof.

Generally, a solid oxide fuel cell (SOFC) is a device which produces water and electricity through an electrochemical reaction occurring between hydrogen and oxygen. In specific, the supplied hydrogen is separated into hydrogen ions and electrons at a catalyst of a negative electrode, and the separated hydrogen ions migrate to positive electrodes through an electrolyte membrane.

To obtain a required potential in a real use, a fuel cell stack is constructed by stacking a number of unit cells, and under a configuration of the fuel cell stack, hydrogen flows into a negative electrode (anode), while air or oxygen is flowing into a positive electrode (cathode), so that an electrochemical reaction occurs in the fuel cell stack to generate electrical energy at high efficiencies and water.

For example, a cylindrical solid oxide fuel cell is disclosed in Korean Patent No. 10-1364131 (issued on Feb. 20, 2014).

According to the conventional solid oxide fuel cell, however, a power generation system of the solid oxide fuel cell has an average power generation efficiency of 45 to 50%, which is relatively low, and besides, the conventional solid oxide fuel cell does not satisfy operating conditions at a high temperature greater than or equal to 700° C. as an operating temperature of the solid oxide fuel cell power generation system, so that the power generation system of the conventional solid oxide fuel cell does not ensure high reliability and durability, thereby undesirably providing low marketability.

SUMMARY

Accordingly, the present invention has been made in view of the above-mentioned problems occurring in the related art, and it is an object of the present invention to provide a solid oxide fuel cell power generation system that is configured to allow an unreacted fuel after the reaction of a fuel cell module to be recycled through a blower and then supplied to an anode of the fuel cell module to improve a power generation efficiency thereof, configured to allow a motor used to operate the blower to be cooled by means of air cooling, and configured to allow air used for cooling the blower to be recycled to a cathode of the fuel cell module, thereby improving the overall efficiency thereof.

To accomplish the above-mentioned object, according to the present invention, there is provided a solid oxide fuel cell power generation system including: a fuel cell module; a blower for supplying a gaseous fuel to the fuel cell module; an air supplier for supplying air to the fuel cell module; and a fuel supplier for supplying the gaseous fuel to the blower, wherein the blower recycles at least a portion of an unreacted gaseous fuel to the fuel cell module.

According to the present invention, desirably, the fuel cell module may include a stack having an anode and a cathode and generating electricity, and the gaseous fuel supplied to the blower from the fuel supplier is mixed with the unreacted gaseous fuel transferred to the blower and then transferred to the stack.

According to the present invention, desirably, the air supplier transfers the air to the blower to allow the blower to be cooled by the air and thus supplies the air whose temperature is raised after cooling the blower to the fuel cell module.

According to the present invention, desirably, the solid oxide fuel cell power generation system may further include an air-blowing heat exchanger for heating the air, the air supplier supplying the air whose temperature is raised after cooling the blower to the fuel cell module through the air-blowing heat exchanger.

According to the present invention, desirably, the fuel cell module may include a reformer adapted to perform a reforming reaction for the gaseous fuel supplied from the blower.

According to the present invention, desirably, the blower may include: a motor disposed therein; a motor stator for supporting the motor; a shaft rotating with the power supplied from the motor; an impeller rotatably coupled to one end portion of the shaft to generate the flow of a fluid; a heat shield for blocking the heat generated by the rotation of the shaft; a volute for inducing the flow of the gaseous fuel supplied to the interior thereof from a linear direction to a centrifugal direction with respect to the rotary axis of the shaft; and a diffuser extended from the volute to restore the pressure of gaseous fuel reduced by the volute.

According to the present invention, desirably, the shaft may include a disc disposed on one side thereof to surround the outer peripheral surface thereof, and the blower may include journal foil bearings for surrounding at least a portion of the outer peripheral surface of the shaft and thrust foil bearings for surrounding at least a portion of the outer peripheral surface of the disc.

According to the present invention, desirably, the blower may further include a sealing member disposed between the shaft and the impeller.

According to the present invention, desirably, the air supplier may include: a filter for filtering the air; an air blower for transferring the filtered air; and an air flow meter for measuring the flow rate of air transferred to the blower from the air blower.

According to the present invention, desirably, the blower may include: an air inlet allowing the air transferred by the air blower to be introduced thereinto; and an air outlet allowing the air introduced through the air inlet to be exhausted to the outside thereof, and the air transferred to the interior of the blower from the air inlet through the air blower cools the blower so that the air whose temperature is raised after cooling the blower is transferred to the fuel cell module.

According to the present invention, desirably, the fuel supplier may include: a fuel pump for transferring the gaseous fuel; a fuel flow meter for measuring the flow rate of the gaseous fuel transferred to the blower through the fuel pump; and a desulfurizer for removing sulfur from the gaseous fuel transferred to the blower through the fuel pump.

According to the present invention, desirably, the fuel supplier may include: a first valve for controlling the flow rate of the gaseous fuel supplied to the blower through the fuel pump; and a second valve for controlling the flow of the unreacted gaseous fuel.

According to the present invention, desirably, the solid oxide fuel cell power generation system may further include a catalyst for removing harmful components existing in the air in a process where after the air and the gaseous fuel that are supplied to the fuel cell module have been reacted with each other in the fuel cell module, the air and the gaseous fuel are exhausted.

According to the present invention, desirably, the solid oxide fuel cell power generation system may further include a heat collector for collecting waste heat in the air and the gaseous fuel in a process where after the air and the gaseous fuel that are supplied to the fuel cell module have been reacted with each other in the fuel cell module, the air and the gaseous fuel are exhausted.

According to the present invention, desirably, the heat collector may include: a heat-collecting heat exchanger for performing heat exchange between the air and the gaseous fuel when the air and the gaseous fuel are exhausted after reacted with each other in the fuel cell module; and a vent for exhausting the air and gaseous fuel whose heat exchange is completed in the heat-collecting heat exchanger.

According to the present invention, desirably, the heat collector may include: a low temperature fluid supplier for supplying a low temperature fluid to the heat-collecting heat exchanger and a high temperature fluid supplier for supplying a high temperature fluid produced after the fluid supplied from the low temperature fluid supplier has been heated by the heat-collecting heat exchanger to the outside thereof.

According to the present invention, desirably, the solid oxide fuel cell power generation system may further include a controller for controlling the blower and the fuel supplier, the fuel supplier having a fuel pump adapted to supply the gaseous fuel to the blower, and the controller controlling the blower and the fuel pump to control the ratio of the gaseous fuel to the unreacted gaseous fuel supplied to the fuel cell module from the blower.

According to the present invention, desirably, the controller may include an input device for inputting the ratio of the gaseous fuel to the unreacted gaseous fuel supplied to the fuel cell module from the blower.

According to the present invention, desirably, the controller may control the fuel pump according to a recycle ratio received through the input device to allow the quantity of gaseous fuel supplied to the blower to be controlled.

According to the present invention, desirably, the recycle ratio is set to 50 to 70%.

BRIEF DESCRIPTION OF THE DRAWINGS

The above and other objects, features and advantages of the present invention will be apparent from the following detailed description of the embodiments of the invention in conjunction with the accompanying drawings, in which:

FIG. 7 is a diagram showing a control configuration of the solid oxide fuel cell power generation system according to the present invention;

FIGS. 8 to 11 are diagrams showing simulation modeling for performance analysis of the solid oxide fuel cell power generation system according to the present invention;

FIGS. 12 to 19 are diagrams showing the processes of setting a rotating speed of a motor according to a target mass flow rate in the solid oxide fuel cell power generation system according to the present invention;

FIG. 20 is a diagram showing a method for predicting the flow rate in the solid oxide fuel cell power generation system according to the present invention.

DETAILED DESCRIPTION

Figure 1:
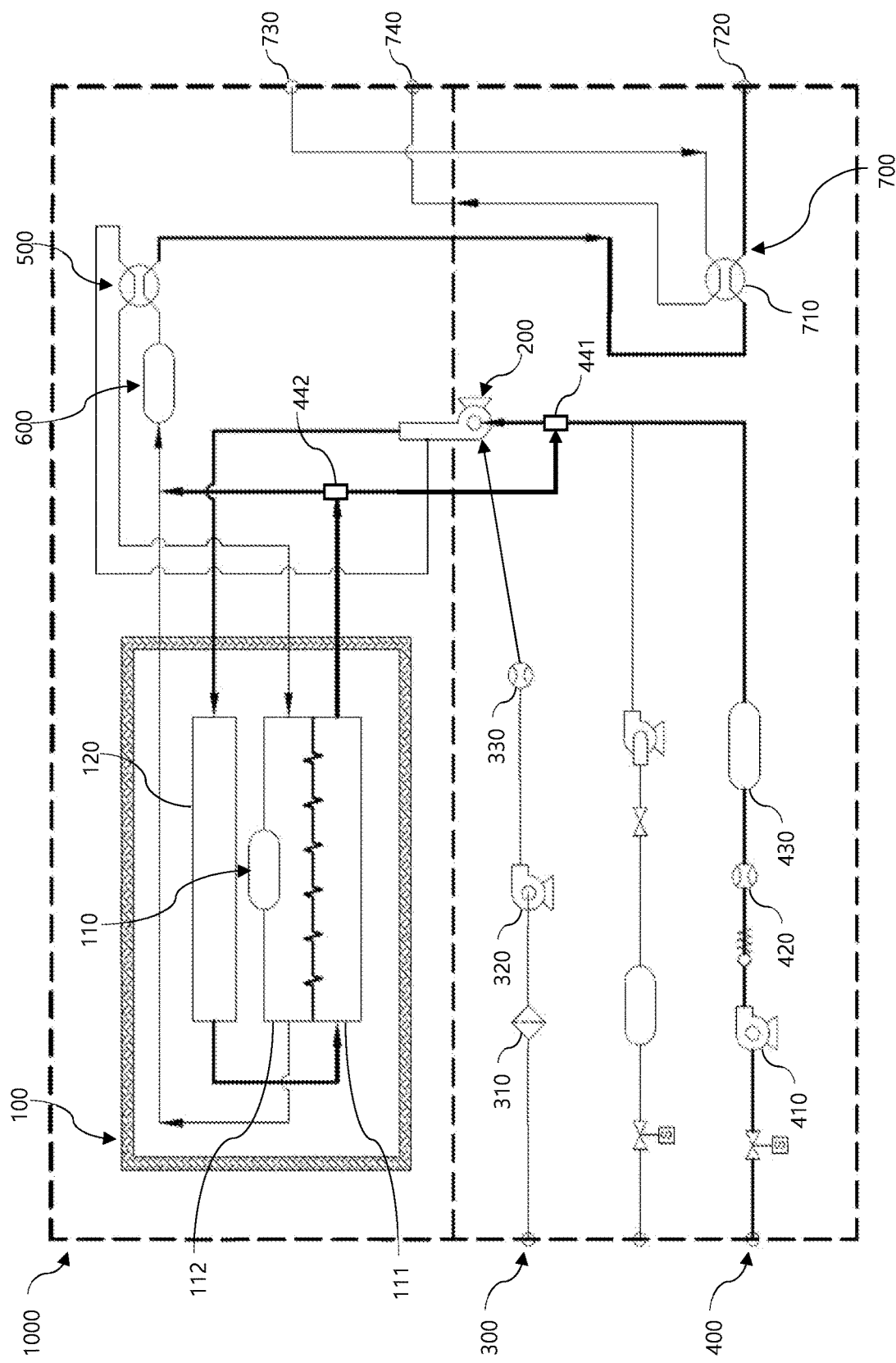
FIG. 1 is a diagram showing a solid oxide fuel cell power generation system according to the present invention.

Before the present invention is disclosed and described, the terminology used herein will be explained briefly.

All terms used herein, including technical or scientific terms, unless otherwise defined, have the same meanings which are typically understood by those having ordinary skill in the art. The terms, such as ones defined in common dictionaries, should be interpreted as having the same meanings as terms in the context of pertinent technology, and should not be interpreted as having ideal or excessively formal meanings unless clearly defined in the specification.

In the description, when it is said that one portion is described as "includes" any component, one element further may include other components unless no specific description is suggested.

The present invention may be modified in various ways and may have several exemplary embodiments. Specific exemplary embodiments of the present invention are illustrated in the drawings and described in detail in the detailed description. However, this does not limit the invention within specific embodiments and it should be understood that the invention covers all the modifications, equivalents, and replacements within the idea and technical scope of the invention.

Objects, characteristics and advantages of the present invention will be more clearly understood from the detailed description as will be described below and the attached drawings.

Hereinafter, the present invention will be explained in detail with reference to the attached drawings.

Figure 2:
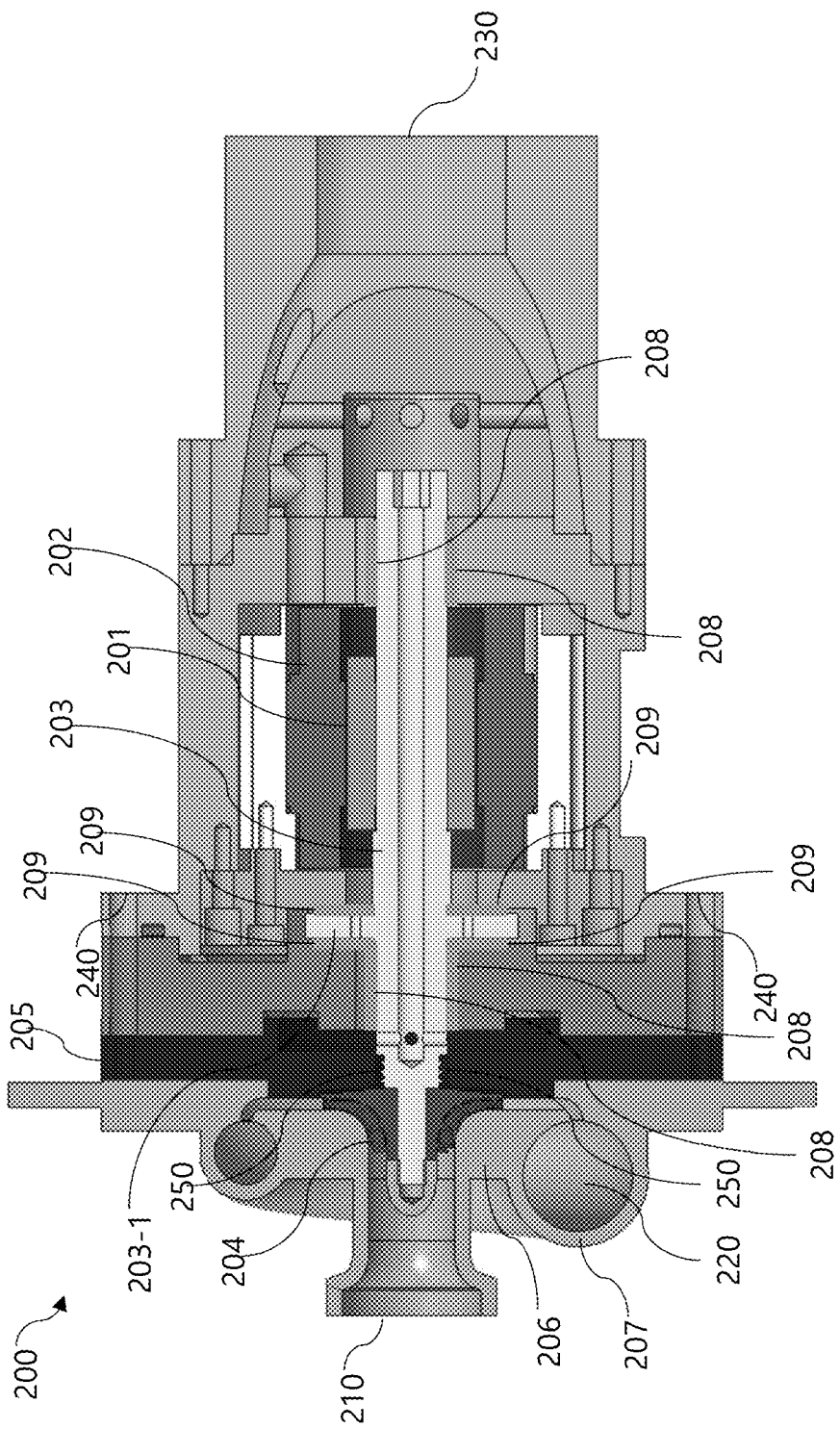
FIG. 2 is a sectional view showing a blower of the solid oxide fuel cell power generation system according to the present invention.

Referring to FIGS. 1 and 2, a solid oxide fuel cell power generation system 1000 according to the present invention largely includes a fuel cell module 100, a blower 200 for supplying a gaseous fuel to the fuel cell module 100, an air supplier 300 for supplying external air to the fuel cell module 100, and a fuel supplier 400 for supplying the gaseous fuel to the blower 200, wherein the blower 200 recycles at least a portion of an unreacted gaseous fuel to the fuel cell module 100.

First, the fuel cell module 100 is provided. The fuel cell module 100 includes a stack 110 having an anode 111 and a cathode 112 and generating electricity through an electrochemical reaction, a gaseous fuel supply line adapted to allow the fuel supplier 400 to communicate with the stack 110 so as to supply the gaseous fuel to the stack 110, and an air supply line adapted to allow the air supplier 300 to communicate with the stack 110 so as to supply the air to the stack 110.

Further, the fuel cell module 100 includes a reformer 120 adapted to perform a reforming reaction for the gaseous fuel supplied from the blower 200, and the reformer 120 communicates with the gaseous fuel supply line. In this case, a water supply line may be connected to the reformer 120 so as to supply water used in the reformer 120.

Next, the blower 200 is provided. The blower 200 is controlled by a controller 800 as will be discussed later and serves to transfer the gaseous fuel supplied from the fuel supplier 400 to the stack 110.

In this case, the gaseous fuel supplied to the blower 200 from the fuel supplier 400 is mixed with the unreacted gaseous fuel transferred to the blower 200, and accordingly, a mixture is transferred to the stack 110 through the reformer 120. In specific, the gaseous fuel transferred to the fuel cell module 100 is electrochemically reacted with an oxidant to generate electrical energy. In this case, the unreacted gaseous fuel, which has not been reacted with the oxidant and thus has remained, is transferred again to the blower 200. That is, the blower 200 serves to transfer the gaseous fuel supplied from the fuel supplier 400 and the unreacted gaseous fuel remaining in the interior of the fuel cell module 100 to the fuel supplier 400. In specific, the blower 200 serves to mix the unreacted gaseous fuel remaining in the fuel cell module 100 and the gaseous fuel supplied from the fuel supplier 400 with each other and thus to recycle the mixture between the unreacted gas and the gaseous fuel to the fuel cell module 100.

In this case, the blower 200 includes a motor 201 disposed inside a casing constituting an outer shape thereof, a motor stator 202 for supporting the motor 201, a shaft 203 rotating with the power supplied from the motor 201, an impeller 204 rotatably coupled to one end portion of the shaft 203 to generate the flow of a fluid, a heat shield 205 for blocking the heat generated by the rotation of the shaft 203, a volute 206 for inducing the flow of the gaseous fuel supplied to the interior thereof from a linear direction to a centrifugal direction with respect to the rotary axis of the shaft 204, a diffuser 207 extended from the volute 206 to restore the pressure of the gaseous fuel reduced by the volute 206, and journal foil bearings 208 and thrust foil bearings 209 for supporting the shaft 203. In this case, the journal foil bearings 208 and the thrust foil bearings 209 are foil-air bearings.

In more specific, the shaft 203 is provided inside the casing in a longitudinal direction of the casing. One end portion of the shaft 203 is coupled to the motor 201 so that the shaft 203 rotates by the rotation of the motor 201, and the other end portion thereof is coupled to the impeller 204 to transfer the rotary force of the motor 201 to the impeller 204. Further, the shaft 203 includes a disc 203-1 disposed on one side thereof. The disc 203-1 surroundingly extends radially from the outer peripheral surface of the shaft 203. In this case, the disc 203-1 serves to prevent the shaft 203 from being transferred axially or generating vibrations. As the impeller 204 rotates, in specific, an axial force may be generated due to a pressure difference between the front side and the rear side of the impeller 204, and accordingly, the disc 203-1 supports the axial force. In this case, the disc 203-1 has a hole axially passing therethrough, and the disc 203-1 and the shaft 203 may be cooled by means of the air introduced through an air inlet 230 as will be discussed later.

Further, the impeller 204 is coupled to the other end portion of the shaft 203. In this case, the impeller 204 rotates together with the rotation of the shaft 203, and so as to generate the flow of fluid through the rotation of the impeller 204, blades are disposed radially from the center of the impeller 204. In specific, the impeller 204 has a hollow portion formed at the inside thereof so that it can fit to the other end portion of the shaft 203, and the blades are located around the outer peripheral surface of the impeller 204 so that they rotate by the rotation of the shaft 203 to generate the flow of fluid.

Further, the heat shield 205 is fitted to the other end portion of the shaft 203 to surround the outer peripheral surface of the shaft 203. In specific, the heat shield 205 is coupled to the shaft 203, while being adjacent to the rear end of the impeller 204, to thus prevent the heat generated by the rotation of the shaft 203 from being emitted.

Further, the volute 206 is coupled to the front side of the casing to seal the interior of the casing. Further, the volute 206 has a pathway formed therein to the shape of tornado around the rotary center axis of the shaft 203 so as to induce the flow of the gaseous fuel supplied to the interior of the blower 200 from the linear direction to the centrifugal direction with respect to the rotary axis of the shaft 203.

Further, the diffuser 207 is coupled to the tornado-shaped pathway of the volute 206 and has a sectional area gradually increasing toward the end portion thereof from the volute 206, so that the diffuser 207 reduces the flow rate of the gaseous fuel, which is reduced by the volute 206, to thus increase a static pressure. That is, the diffuser 207 restores the pressure of gaseous fuel reduced by the volute 206.

Further, the journal foil bearings 208 are provided to surround at least a portion of the outer peripheral surface of the shaft 203 at a point where the outer peripheral surface of the shaft 203 and the inner peripheral surface of the casing interfere with each other, and thus, the journal foil bearings 208 serve to support the shaft 203. Further, the thrust foil bearings 209 are provided to surround at least a portion of the outer peripheral surface of the disc 203-1 at a point where the outer peripheral surface of the disc 203-1 and the inner peripheral surface of the casing interfere with each other, and thus, the thrust foil bearings 209 serve to support the axial force generated from the shaft 203. In this case, one or more journal foil bearings 208 and one or more thrust foil bearings 209 may be provided, and the journal foil bearings 208 and the thrust foil bearings 209 are made of a heat-resistant material so that even in the case where heat is generated by the operation of the motor 201, they can support the shaft 203. Further, coated layers may be formed on the outer peripheral surfaces of the journal foil bearings 208 and the thrust foil bearings 209, and the coated layers may include Teflon. Accordingly, the heat-resisting properties of the bearings are more improved, and in this case, the durability of the blower 200 in a high temperature environment can be improved.

Also, the blower 200 includes a fuel inlet 210 located in front of the volute 206 to communicate with the volute 206 and adapted to introduce the gaseous fuel transferred from the fuel supplier 400 and the unreacted gaseous fuel thereinto, and a fuel outlet 220 located on the end portion of the diffuser 207 to transfer the gaseous fuel transferred from the fuel supplier 400 and the unreacted gaseous fuel to the fuel cell module 100. In this case, the fuel inlet 210 and the fuel outlet 220 communicate with the gaseous fuel supply line. That is, the gaseous fuel transferred from the fuel supplier 400 and the unreacted gaseous fuel are transferred to the blower 200, mixed with each other in the blower 200, and supplied again to the fuel cell module 100, so that the efficiency of the fuel cell module 100 can be more improved.

Next, the air supplier 300 is provided. The air supplier 300 serves to supply external air to the fuel cell module 100. In specific, the air supplier 300 includes a filter 310 for filtering the external air, an air blower 320 for transferring the filtered air, and an air flow meter 330 for measuring the flow rate of air transferred to the blower 200 from the air blower 320.

In this case, the air supplier 300 transfers the external air to the blower 200 to allow the blower 200 to be cooled by the external air and supplies the external air whose temperature is raised after cooling the blower 200 to the fuel cell module 400. That is, if the external air is supplied to the blower 200 through the air blower 320, the blower 200, which is heated by means of the high-temperature unreacted gaseous fuel, becomes cooled by the external air. After that, the external air heated after cooling the blower 200 is transferred to the cathode 112 by means of the air blower 320. As the temperature of the air supplied to the fuel cell module 100 is raised, that is, the reaction efficiency of the fuel cell module 100 at a high temperature becomes more improved.

In this case, the solid oxide fuel cell power generation system 1000 according to the present invention further includes an air-blowing heat exchanger 500 for heating the external air. That is, the air-blowing heat exchanger 500 serves to raise the temperature of the air supplied to the fuel cell module 100.

Figure 3:
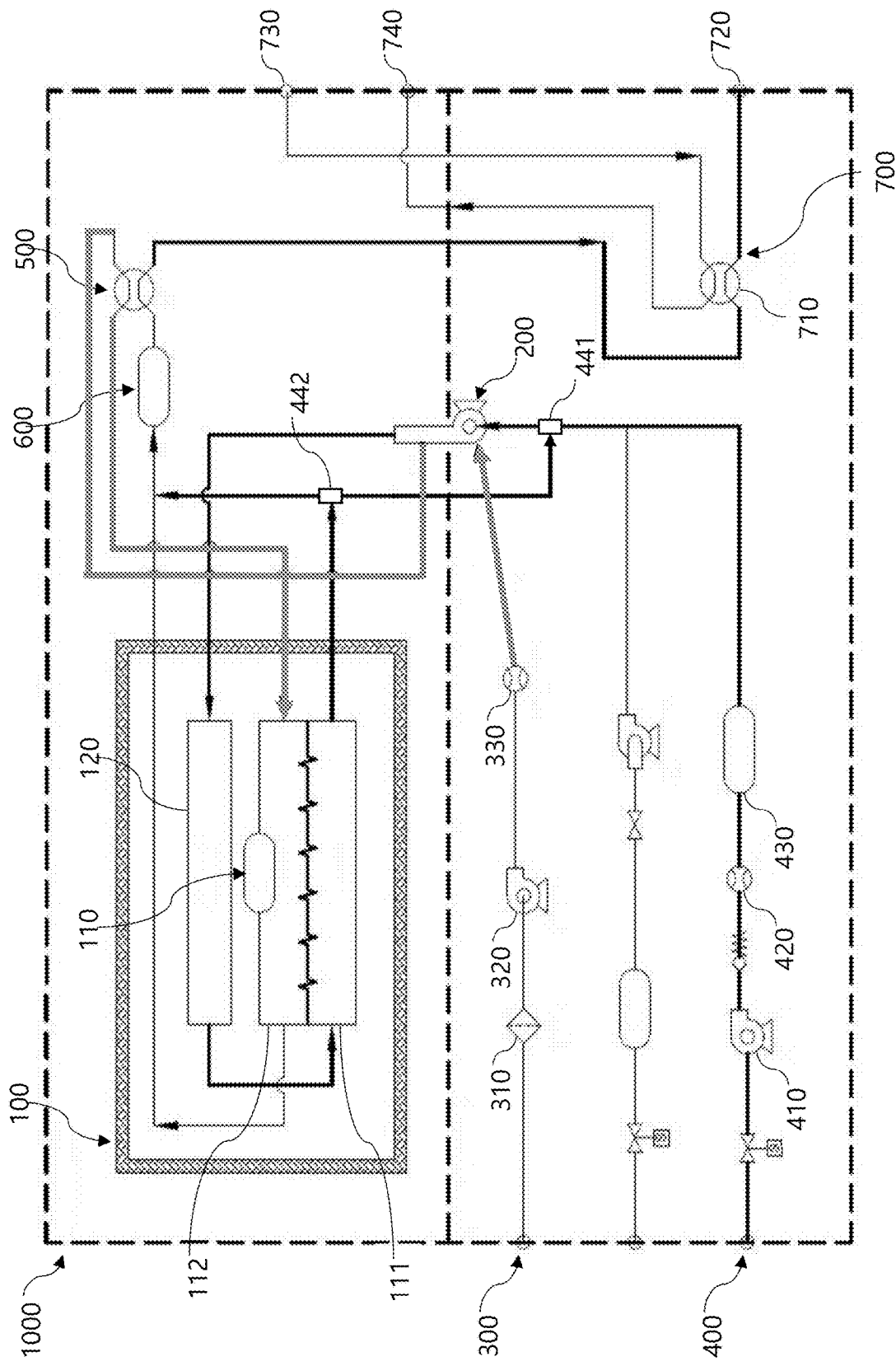
FIG. 3 is a diagram showing the flow of air in the solid oxide fuel cell power generation system according to the present invention.

Referring to FIG. 3, the air supplier 300 supplies the external air whose temperature is raised after cooling the blower 200 to the fuel cell module 400 via the air-blowing heat exchanger 500. In specific, the external air transferred to the blower 200 through the air blower 320 cools the blower 200, so that it is primarily heated, and next, the external air is transferred to the air-blowing heat exchanger 500 through the air blower 320, so that it is secondarily heated. Next, the external air is transferred to the cathode 112, thereby advantageously more improving the efficiency of the fuel cell module 100.

TABLE 1

| Division | Without blower | With blower |
| --- | --- | --- |
| Recycle ratio | — | 68% |
| S/C ratio | 3.0 | 3.0 |
| Water supply quantity | 0.175 kmol/hr | — |
| Power generation efficiency | 41.3% | 57.13% |

For example, Table 1 shows the results obtained by making process flows of the temperatures and operating points of the power generation system acquired by the test estimation and operating optimization of the stack 110 using data and a piping and instrumentation diagram (P&ID) and performing computer simulation analysis for the process flows. As the temperature of air supplied to the fuel cell module 100 is increased by means of the blower 200, that is, the power generation efficiency of the solid oxide fuel cell power generation system 1000 according to the present invention is more raised by 15 to 17% than that of the conventional solid oxide fuel cell power generation system.

Now, an explanation of the computer simulation analysis will be given in detail. A user-defined function (UDF) program available to ASPEN software for system analysis is used, and simulation modeling as shown in FIGS. 8 to 11 is suggested. First, $V_N$ is an open circuit voltage (OCV) or a reversible voltage of a solid oxide fuel cell, and Gibbs free energy is changed according to a reactant and a temperature, pressure and concentration of a product, which are provided as shown in FIG. 8. A first order term of the expression is ideal potential $E_0$, and a second order term indicates the temperature, pressure, and temperature of the reactant applied to fuel cells and an influence of the product applied to the cell voltage. In this case, $T_{avg}$ is a temperature of an inlet and outlet stream (K) of the solid oxide fuel cell, $R_g$ is a gas constant of 8.314 J/mol-K, and $P_i$ is an average partial pressure of gas (atm). Further, FIG. 9 shows all electrochemical equations for calculating activated polarization of the solid oxide fuel cell. Referring further to FIG. 10, ohmic losses are generated from the resistances caused by the flows of electrons through ion flows of electrolyte and electrodes, and polarization of ohm according to Ohm's law is represented. Also, a concentration higher than the potential is generated by the concentration-gradient (concentration reduction of material) in electrode-electrolyte interface due to the resistance to transportation, and if it is desired to calculate a concentration for a potential difference, the concentrations of gas species on triple phase boundary (TPB) have to be analyzed, which expressions are shown in FIG. 11.

Next, the analysis results of the conventional solid oxide fuel cell power generation system are suggested in Table 2 wherein the power generation efficiency is 41.3%, and the specific analysis results of the solid oxide fuel cell power generation system 1000 according to the present invention are suggested in Table 3 wherein the power generation efficiency is 57.13%.

TABLE 2

| Parameters | | Symbol | Unit | Value |
| --- | --- | --- | --- | --- |
| Fuel utilization of stack | | Fusofc | % | 58.5 |
| Air utilization | | Uair | % | 45.0 |
| Recycle ratio | | RR | % | 0.0 |
| Flow rate of water in | | WATER-IN | Kmole/Hr | 0.175 |
| Flow rate of air in | | AIR-IN | Kmole/Hr | 0.697 |
| Flow rate | in Reformer | FUEL-IN | Kmole/Hr | 0.0533 |
| of Fuel supply | in Burner | Fuel-in-Bur | Kmole/Hr | 0.0 |
| LHV of fuel | | LHV_F | J/mole | 816588 |
| V_Cell | | V | V | 0.7 |
| I_Current | | I | A | 71.4 |
| Number of Cells | | Num_Cell | — | 100 |
| Efficiency | | Eff. | % | 41.3 |

TABLE 3

| Parameters | | Symbol | Unit | Value |
| --- | --- | --- | --- | --- |
| Fuel utilization of stack | | Fusofc | % | 58.5 |
| Air utilization | | Uair | % | 45.0 |
| Recycle ratio | | RR | % | 68.0 |
| Flow rate of water in | | WATER-IN | Kmole/Hr | 0.0 |
| Flow rate of air in | | AIR-IN | Kmole/Hr | 0.697 |
| Flow rate | in Reformer | FUEL-IN | Kmole/Hr | 0.383 |
| of Fuel supply | in Burner | Fuel-in-Bur | Kmole/Hr | 0.0 |
| LHV of fuel | | LHV_F | J/mole | 816588 |
| V_Cell | | V | V | 0.69 |
| I_Current | | I | A | 71.4 |
| Number of Cells | | Num_Cell | — | 100 |
| Efficiency | | Eff. | % | 57.13 |

Figure 4:
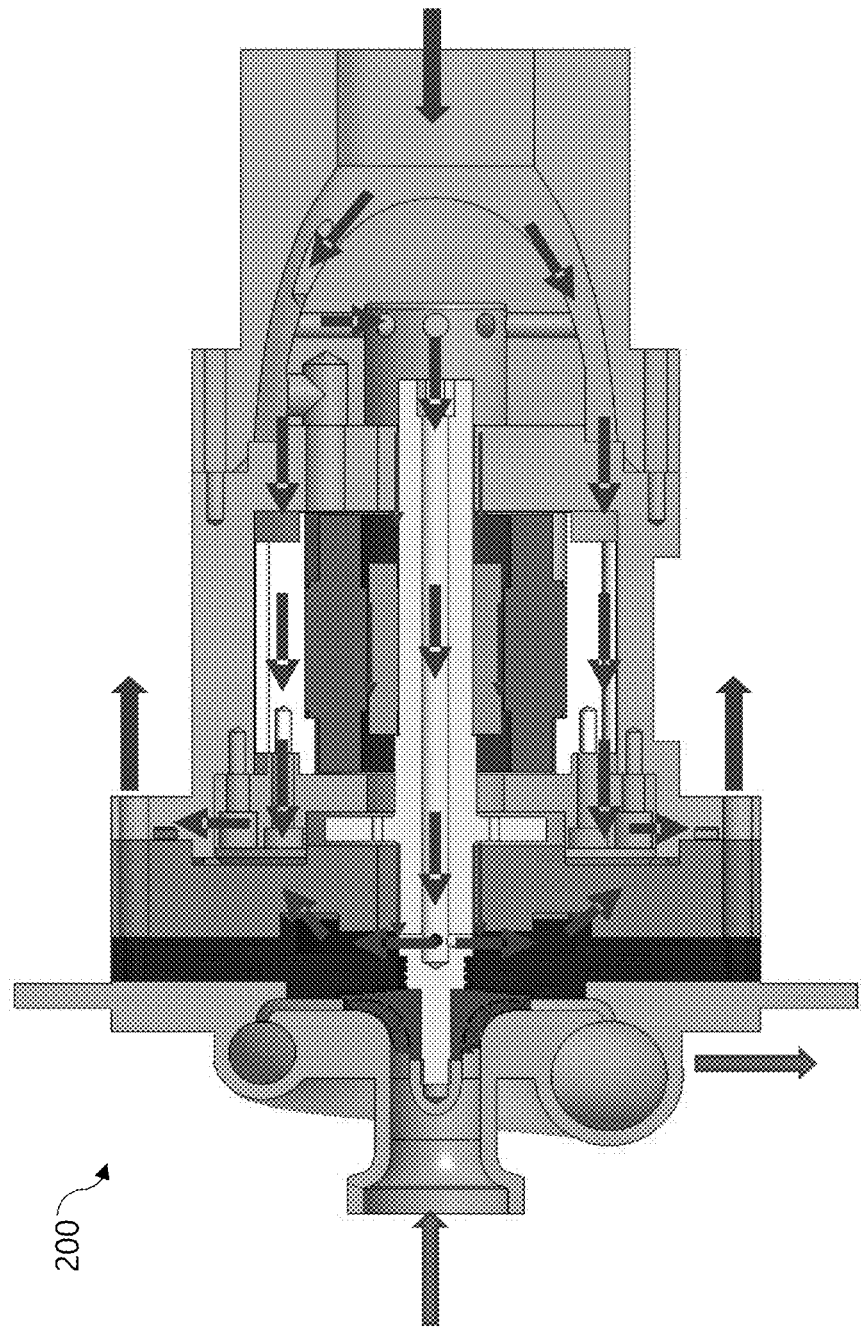
FIG. 4 is a sectional view showing the flows of air and gaseous fuel inside the blower of the solid oxide fuel cell power generation system according to the present invention.

Referring next to FIG. 4, the blower 200 includes the air inlet 230 communicating with one side of the casing to allow the external air transferred by the air blower 320 to be introduced thereinto and an air outlet 240 communicating with the other side of the casing to allow the external air introduced thereinto through the air inlet 230 to flow to the interior thereof in the longitudinal direction thereof, to perform cooling therefor, and to be then transferred to the air-blowing heat exchanger 500. In this case, the air inlet 230 and the air outlet 240 communicate with the air supply line. Accordingly, the external air introduced into the blower 200 through the air inlet 230 flows to the entire interior of the blower 200, cools the interior of the blower 200, and is then transferred to the fuel cell module 100. In this case, the shaft 203 is a hollow shaft whose one end is open and has a plurality of holes formed radially on the other end thereof, through which the external air flows to the interior of the shaft 203 to make the shaft 203 cooled.

Further, the blower 200 includes a sealing member 250 for preventing the external air introduced thereinto through the air inlet 230 from leaking to a gap between the shaft 203 and the impeller 204. That is, the sealing member 250 serves to prevent the external air transferred to the interior of the blower 200 from leaking to the volute 206 and being thus mixed with the gaseous fuel.

Next, the fuel supplier 400 is provided. The fuel supplier 400 serves to supply the gaseous fuel to the fuel cell module 100. In specific, the fuel supplier 400 includes a fuel pump 410 for transferring the gaseous fuel, a fuel flow meter 420 for measuring the flow rate of gaseous fuel transferred to the blower 200 through the fuel pump 410, and a desulfurizer 430 for removing sulfur from the gaseous fuel. That is, the fuel pump 410 provides a driving force so that the gaseous fuel can be supplied to the blower 200. As the output of the fuel pump 410 is controlled, accordingly, the quantity of gaseous fuel supplied to the fuel cell module 100 can be controlled.

Figure 5:
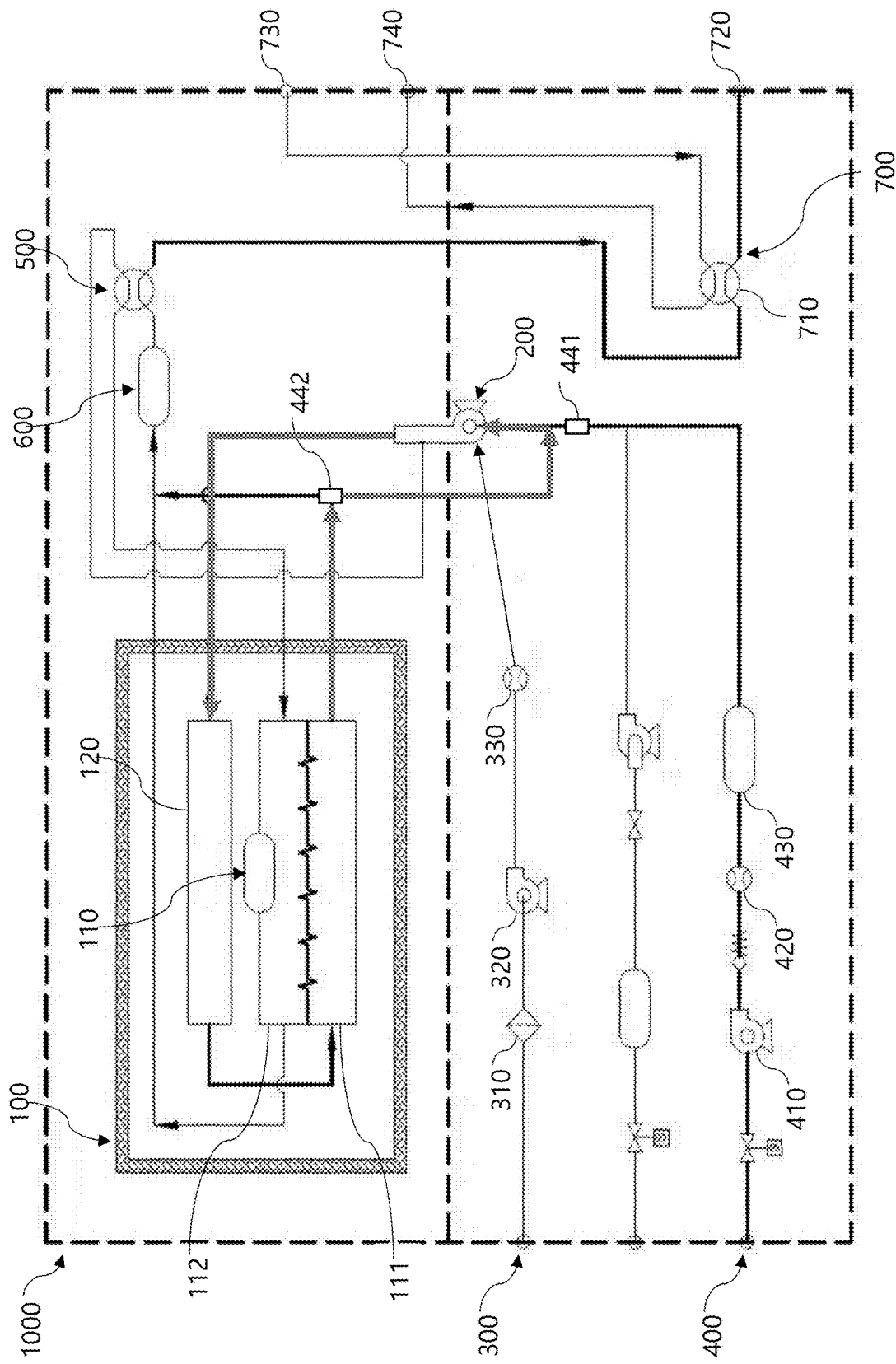
FIGS. 5 and 6 are diagrams showing the circulation of gaseous fuel through valves in the solid oxide fuel cell power generation system according to the present invention.
Figure 6:
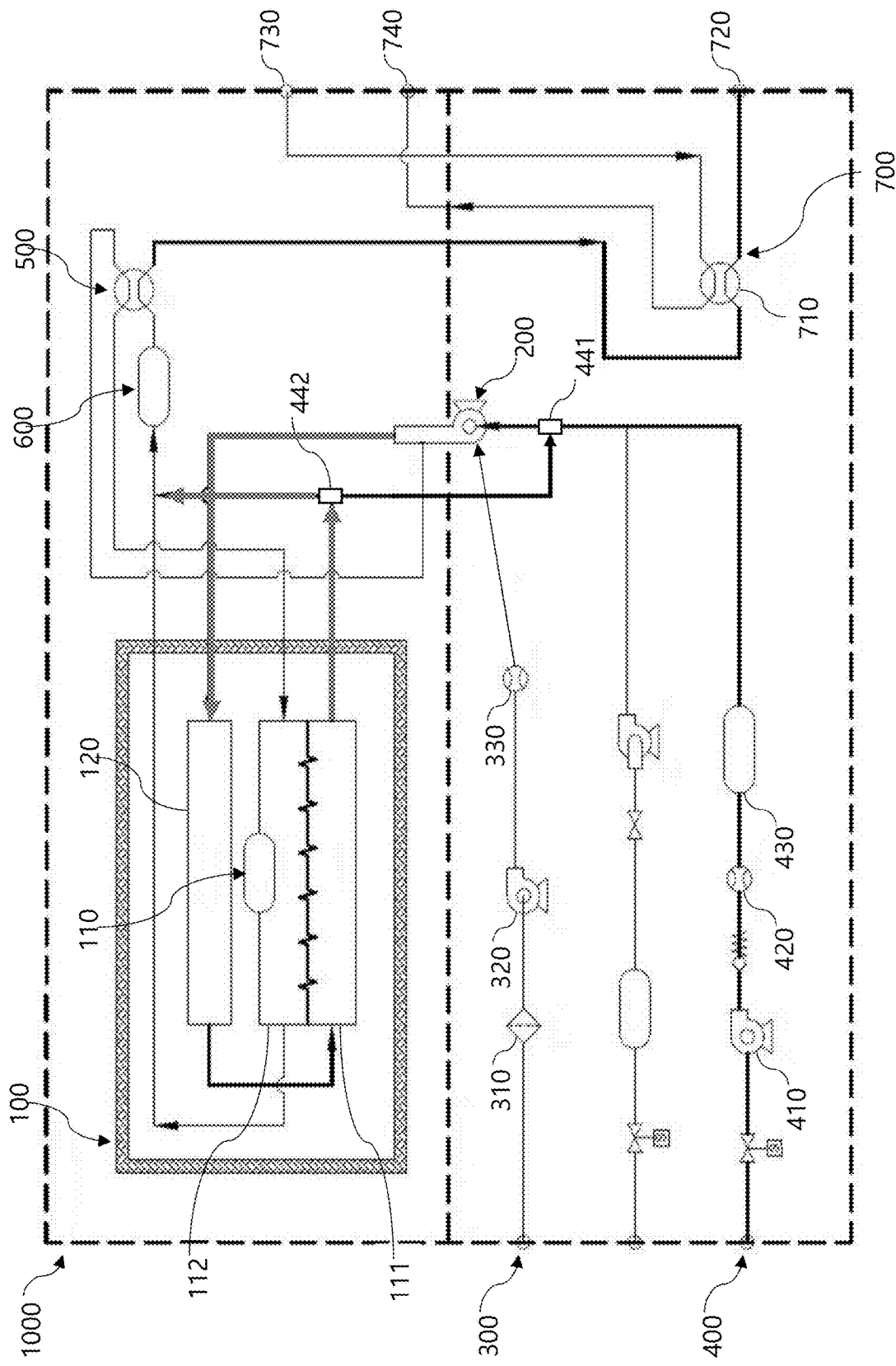

Referring to FIGS. 5 and 6, the fuel supplier 400 includes a first valve 441 for controlling the flow of gaseous fuel supplied to the blower 200 through the fuel pump 410 and a second valve 442 for controlling the flow of unreacted gaseous fuel. In this case, the first valve 441 and the second valve 442 are solenoid valves whose opening and closing are controlled by the controller 800 as will be discussed later, and the second valve 442 may be a three way valve. If the first valve 441 is open, that is, the gaseous fuel transferred through the fuel pump 410 is supplied to the blower 200, and if the first valve 441 is closed, the gaseous fuel transferred through the fuel pump 410 is not supplied to the blower 200. As the second valve 442 is controlled, further, the unreacted gaseous fuel may be transferred to the blower 200 or a heat collector 700 as will be discussed later.

Next, the solid oxide fuel cell power generation system 1000 according to the present invention further includes a catalyst 600 for removing harmful components existing in the external air in a process where the external air supplied to the fuel cell module 100 through the air supplier 300 is transferred to the heat collector 700. That is, the catalyst 600 serves to remove the harmful components existing in the air in a process where in a process where after the air and the gaseous fuel that are supplied to the fuel cell module 100 have been reacted with each other in the fuel cell module 100, the air and the gaseous fuel are exhausted. Further, the catalyst 600 serves to remove the harmful components existing in the gaseous fuel in a process where the gaseous fuel supplied to the fuel cell module 100 through the blower 200 is transferred to the heat collector 700.

Next, the solid oxide fuel cell power generation system 1000 according to the present invention further includes the heat collector 700 for collecting waste heat in the air and the gaseous fuel when the air and the gaseous fuel are exhausted after the air and the gaseous fuel that are supplied to the fuel cell module 100 have been reacted with each other in the fuel cell module 100. In specific, the heat collector 700 includes a heat-collecting heat exchanger 710 for performing heat exchange between the air and the gaseous fuel when the air and the gaseous fuel are exhausted after they have been supplied to the fuel cell module 100 and reacted with each other in the fuel cell module 100 and a vent 720 for exhausting the air and gaseous fuel whose heat exchange is completed. Further, the heat collector 700 includes a low temperature fluid supplier 730 for supplying a low temperature fluid to the heat-collecting heat exchanger 710 and a high temperature fluid supplier 740 for supplying a high temperature fluid produced after the fluid supplied from the low temperature fluid supplier 730 has been heated by the heat-collecting heat exchanger 710 to the outside thereof.

Referring next to FIG. 7, the solid oxide fuel cell power generation system 1000 according to the present invention further includes the controller 800 for controlling the blower 200 and the fuel supplier 400. In addition to the blower 200 and the fuel supplier 400, in this case, the controller 800 controls the fuel cell module 100, the air supplier 300, the air-blowing heat exchanger 500, the catalyst 600, and the heat collector 700.

In this case, the controller 800 controls the blower 200 and the fuel pump 410 to control the ratio of the gaseous fuel to the unreacted gaseous fuel supplied to the fuel cell module 100 from the blower 200. If the operation of the fuel pump 410 is stopped, that is, 100% of the gaseous fuel supplied to the blower 200 is recycled, and as the quantity of the gaseous fuel supplied to the blower 200 through the fuel pump 410 is increased, the recycle ratio of the gaseous fuel is decreased.

In more specific, the controller 800 includes an input device 810 for receiving the ratio of the gaseous fuel to the unreacted gaseous fuel supplied to the fuel cell module 100 from the blower 200. In this case, the input device 810 may be a computer or smartphone, or any one which transmits information to the controller 800 through wired or wireless communication. That is, if the recycle ratio is transmitted to the controller 800 through the input device 810 by a user, the controller 800 controls the fuel pump 410 to adjust the quantity of gaseous fuel supplied to the blower 200, so that the recycle ratio of the gaseous fuel can be controlled.

If the fuel pump 410 does not operate, for example, the flow rate of gaseous fuel supplied from the fuel supplier 400 to the anode 111 is zero, so that the recycle ratio of the gaseous fuel through the blower 200 is 100%. If the fuel pump 410 operates to allow the gaseous fuel supplied to the blower 200 to correspond to 10% of the flow rate of the gaseous fuel supplied from the blower 200 to the anode 111, 10% of the flow rate of the gaseous fuel supplied to the anode 110 is exhausted to the outside through the vent 720 under the control of the second valve 442, so that the recycle ratio of the gaseous fuel through the blower 200 is 90%.

Figure 21:
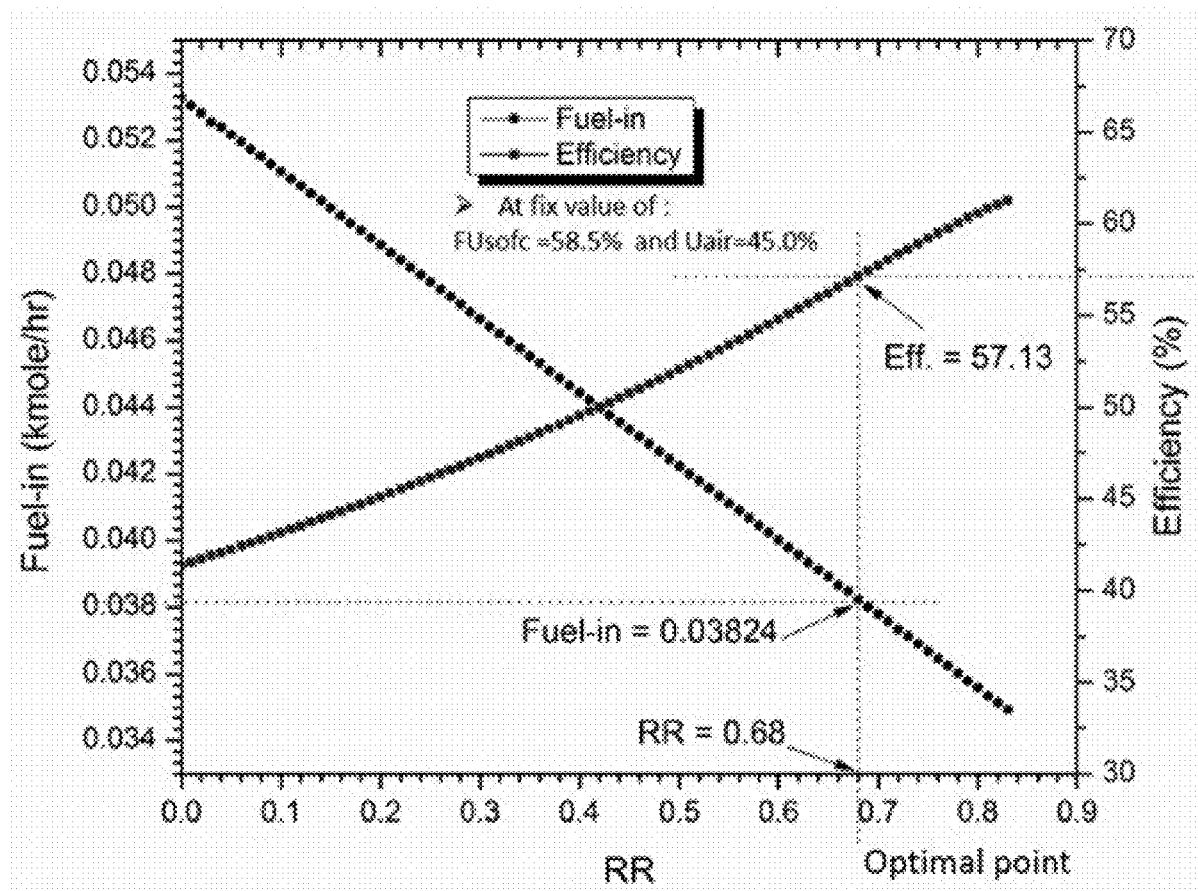
FIG. 21 is a graph showing changes in steam-to-carbon ratios and fuel quantities according to a recycle ratio in the solid oxide fuel cell power generation system according to the present invention.

Referring to FIG. 21, in this case, the recycle ratio of the gaseous fuel can be set to 50 to 70%. If the recycle ratio is less than 50%, the efficiency of the power generation system may become drastically low. If the recycle ratio is greater than 70%, the consumption power of the blower 200 for the recycling may be increased and the flow rate of air needed to keep the stack 110 to an appropriate temperature may be increased, so that the consumption power of the air blower 320 may be suddenly increased to thus decrease the output of the power generation system. As the recycle ratio becomes increased, further, the ratio of the fuel used again becomes raised, so that the proportion of the fuel may be decreased to undesirably cause the output reduction. So as to enhance the efficiency of the power generation system, that is, the flow rate of fuel has to be minimized to increase the utilization of the fuel and the recycle ratio of the fuel. If the flow rate of fuel is reduced and the recycle ratio thereof is increased, however, the temperature of the stack 110 is raised to increase a temperature difference between the anode 111 and the cathode 112, so that the stack 110 may be cracked due to the temperature unbalance. As a result, the recycle ratio of the gaseous fuel may be set to 50 to 70% in consideration of the power generation efficiency and output of the power generation system and the operating stability of the stack 110. That is, the fuel supplier 400 is controlled to supply the gaseous fuel of 30 to 50% of a target mass flow rate as will be discussed later to the blower 200.

Next, the controller 800 receives the target mass flow rate from the input device 810 and controls the rotating speed of the motor 201 according to the received target mass flow rate. In this case, the controller 800 converts ambient temperature test data into high temperature test data using an ambient temperature performance map based on the inlet temperature, inlet pressure, and rotating speed of the blower 200 and the physical properties of the fluid component flowing to the blower 200 and thus controls the rotating speed of the motor 201, so that the recycle flow rate of the blower 200 is controlled. In this case, the blower 200 is at a high temperature, and accordingly, a flow meter cannot be installed around the blower 200. Therefore, the controller 800 controls the rotating speed of the motor 201 according to the received target mass flow rate and thus regulates the flow rate of mass supplied to the stack 110.

Referring in specific to FIG. 12, first, the controller 800 receives the target mass flow rate from the input device 810 and stores the received target mass flow rate. In this case, the ambient temperature performance map has been transmitted to the controller 800 and stored therein.

After that, the controller 800 receives measured values from a plurality of sensors 820 and stores the measured values. In this case, the sensors 820 measure a temperature and pressure around the blower 200, a temperature and pressure of the inlet of the blower 200, into which the fluid flows, a temperature and pressure of the outlet of the blower 200, from which the fluid is exhausted, the rotating speed and temperature of the motor 201, and the power consumption of the motor and then transmits the measured values to the controller 800.

After that, the controller 800 receives constants from the input device 810 and stores the received constants. In this case, as shown in FIG. 13, constant values may include a gas constant, a heat capacity ratio, an inner diameter of the inlet, an inner diameter of the outlet, a reference mass flow rate, a minimum rotating speed, a maximum rotating speed, and a control gain. In this case, the sizes of pipes are determined according to the inner diameters of the pipes, and the control gain is suggested with respect to an initial value, which may be controlled according to control response speeds upon a test.

After that, the controller 800 converts the ambient temperature test data into the high temperature test data, based on the ambient temperature performance map. Referring to FIG. 14, for example, the right values of the Table show the converted values in the case where the inlet temperature $T_1$ is 550° C. and the inlet pressure $P_1$ is 101.325 kPa. If two variables are given, that is, the controller 800 calculates the rest of variables based on the ambient temperature performance map, and intermediate values can be obtained through linear interpolation. In this case, an expression for the conversion is suggested with the following mathematical expression 1.

$$N_i = x_{1i}\sqrt{\gamma RT_i}, \quad Q_{m,i} = x_{2i}\frac{\gamma P_i}{\sqrt{\gamma RT_i}}, \quad Pr_1 = x_3 \qquad \text{[Mathematical expression 1]}$$

where N represents the rotating speed of the motor 201, $X_{1i}$ corrected rotating speed, $\gamma$ heat capacity ratio, R a value obtained by dividing a gas constant into the molar mass of gas, $T_i$ the inlet temperature of the blower 200, $Q_{m,\,i}$ mass flow rate, $x_{2i}$ corrected mass flow rate, $P_{ri}$ the predicted value of a compression ratio on control conditions converted into similarity conditions, and $x_{3i}$ a pressure ratio (outlet pressure/inlet pressure).

Accordingly, if $x_1$ (corrected rotating speed on reference conditions) is multiplied by conversion constant sqrt($\gamma$RT), $N_i$ (converted rotating speed) can be obtained. Further, if $x_2$ (corrected mass flow rate) is multiplied by conversion constant sqrt($\gamma$RT), $Q_m$ (mass flow rate) can be obtained. Moreover, x3 (pressure ratio) has similar values because a difference value before and after correction is small, and accordingly, it is indicated with an equal sign. Further, $\gamma$ as the heat capacity ratio and R as the gas constant are the physical properties of a thermodynamic fluid. In this case, $\gamma$ (specific heat ratio)=$C_p$ (the specific heat at constant pressure)/$C_v$ (the specific heat at constant volume), and generally, air has the specific heat ratio of about 1.4[−]. Further, R represents the value obtained by dividing a gas constant into the molar mass of gas. For example, air has the gas constant of about 287 [J/kg/K]. In addition, T[K] represents a fluid temperature on inlet.

Figure 16:
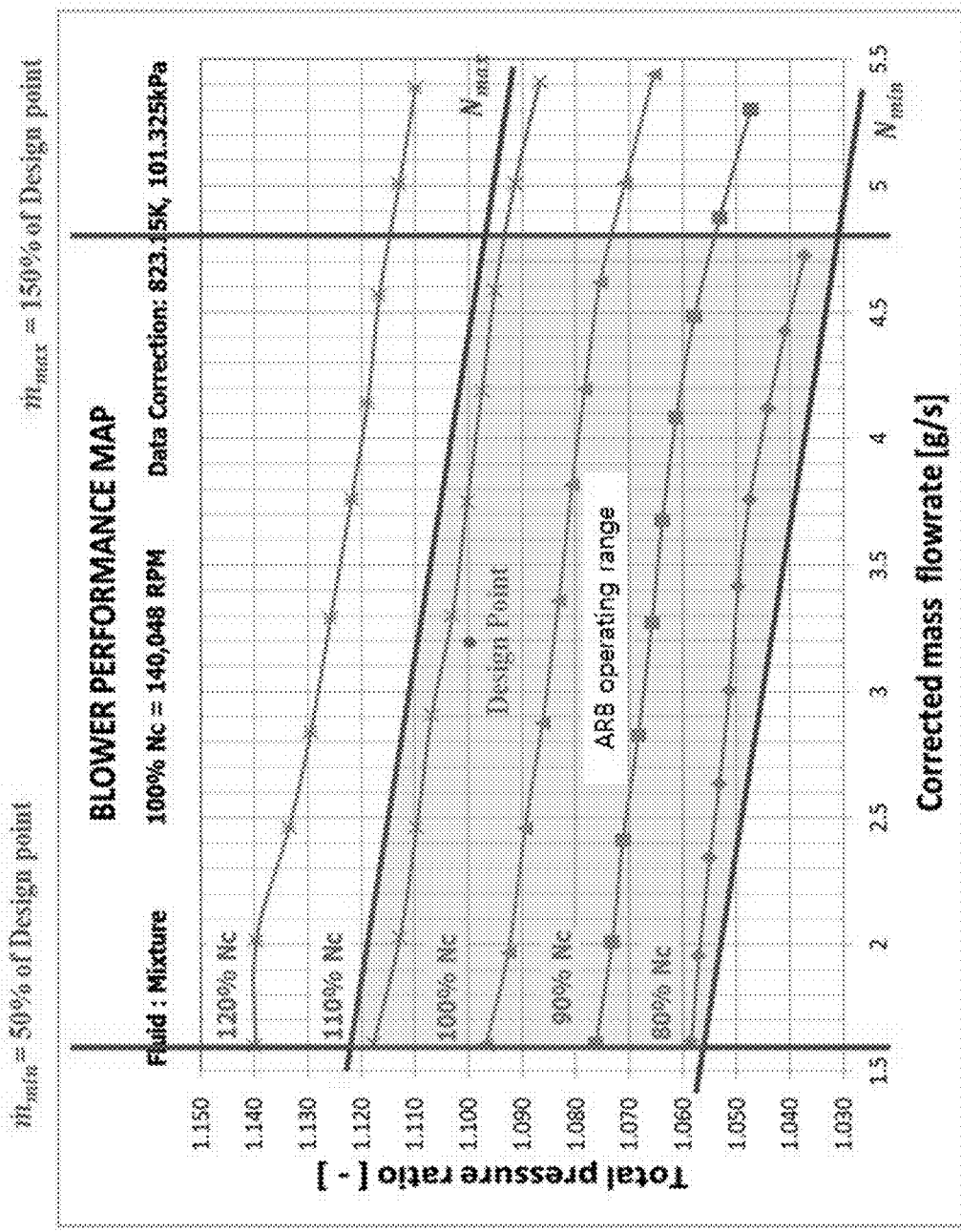

After that, the controller 800 compares limitation conditions with the received and calculated values and thus determines as to whether the power generation system can operate. For example, as shown in FIG. 15, the limitation conditions may include maximum winding temperature, maximum motor power, corrected mass flow rate, maximum and minimum mass flow rates, maximum and minimum rotating speeds, and maximum inlet temperature. Referring to FIG. 16, that is, the controller 800 determines that the power generation system can operate if the received and calculated values are within the operating range of the blower 200 (ARB). That is, the operating range of the blower 200 (ARB) is between the minimum rotating speed $N_{min}$ and the maximum rotating speed $N_{max}$ and between the minimum mass flow rate $Q_{m,\,min}$ and the maximum mass flow rate $Q_{m,\,max}$.

In the case where it is determined that the power generation system can operate, next, the controller 800 performs repeated calculation until the operating range reaches a mass error range. For example, as shown in FIG. 17, the controller 800 calculates a required total pressure ratio, a mass flow rate assumption value, density and velocity of inlet and outlet, total pressure and pressure ratio of inlet and outlet, and a current mass flow rate and thus derives the current mass flow rate. Next, the controller 800 compares the current mass flow rate with the target mass flow rate and performs repeated calculation until the difference value between the current mass flow rate and the target mass flow rate is within the error range. In this case, the output value is suggested as the following mathematical expression 2, and a required flow rate error range is determined according to the following mathematical expression 3.

$$\Delta N = \frac{(Q_{m,r} - Q_{m,cur})}{Q_N} \quad \text{[Mathematical expression 2]}$$

where $\Delta N$ represents speed difference value, $Q_{m, r}$ required flow rate, $Q_{m, cur}$ current flow rate, and $Q_N$ control gain.

Referring to FIG. 13, for example, the control gain $Q_N$ has an initial value of 0.0005, and if a response speed in control upon test is slow, the control gain value is reduced, whereas if a response speed in control is fast, the control gain value is increased. In this case, $\Delta N$ represents a speed difference value as control input. For example, if it is assumed that the required flow rate $Q_{m, r}$ is 1 and the current flow rate $Q_{m, cur}$ at the current rotating speed of the motor 201 is 0.9, $Q_{m, r} - Q_{m, cur} = 0.1$. Like this, if there is a lack of flow rate, the rotating speed of the motor 201 has to be increased, and in this case, the increasing value in the rotating speed is determined by the control gain. For example, if the control gain value is 0.001, the speed difference value $\Delta N$ is 0.1/0.001=100 rpm. That is, the rotating speed of the motor 201 has to be increased by 100 rpm. Contrarily, if the current flow rate is faster than the required flow rate, that is, if $Q_{m, r} - Q_{m, cur} = -0.1$, the speed difference value $\Delta N$ is $-0.1/0.001 = -100$ rpm. That is, the rotating speed of the motor 201 has to be reduced by 100 rpm. Further, if there is a difference between the current flow rate and the required flow rate, the motor 201 rotates at the same speed as before.

$$\left| \frac{Q_{m,r} - Q_{m,cur}}{Q_{m,r}} \right| \times 100 < err_{REQ} \quad \text{[Mathematical expression 3]}$$

where $Q_{m, r}$ represents required flow rate, $Q_{m, cur}$ current flow rate, and $err_{REQ}$ set error inputted. That is, the speed difference value $\Delta N$ is changed until the error value (%) of the required flow rate $Q_{m, r}$ to the current flow rate $Q_{m, cur}$ is less than or equal to the set error. For example, if the required flow rate $Q_{m, r}$ is 1 in a state where the $err_{REQ}$ is set to 1%, the speed difference value $\Delta N$ is changed until the current flow rate $Q_{m, cur}$ is within the range of 0.99 to 1.01.

Figure 19:
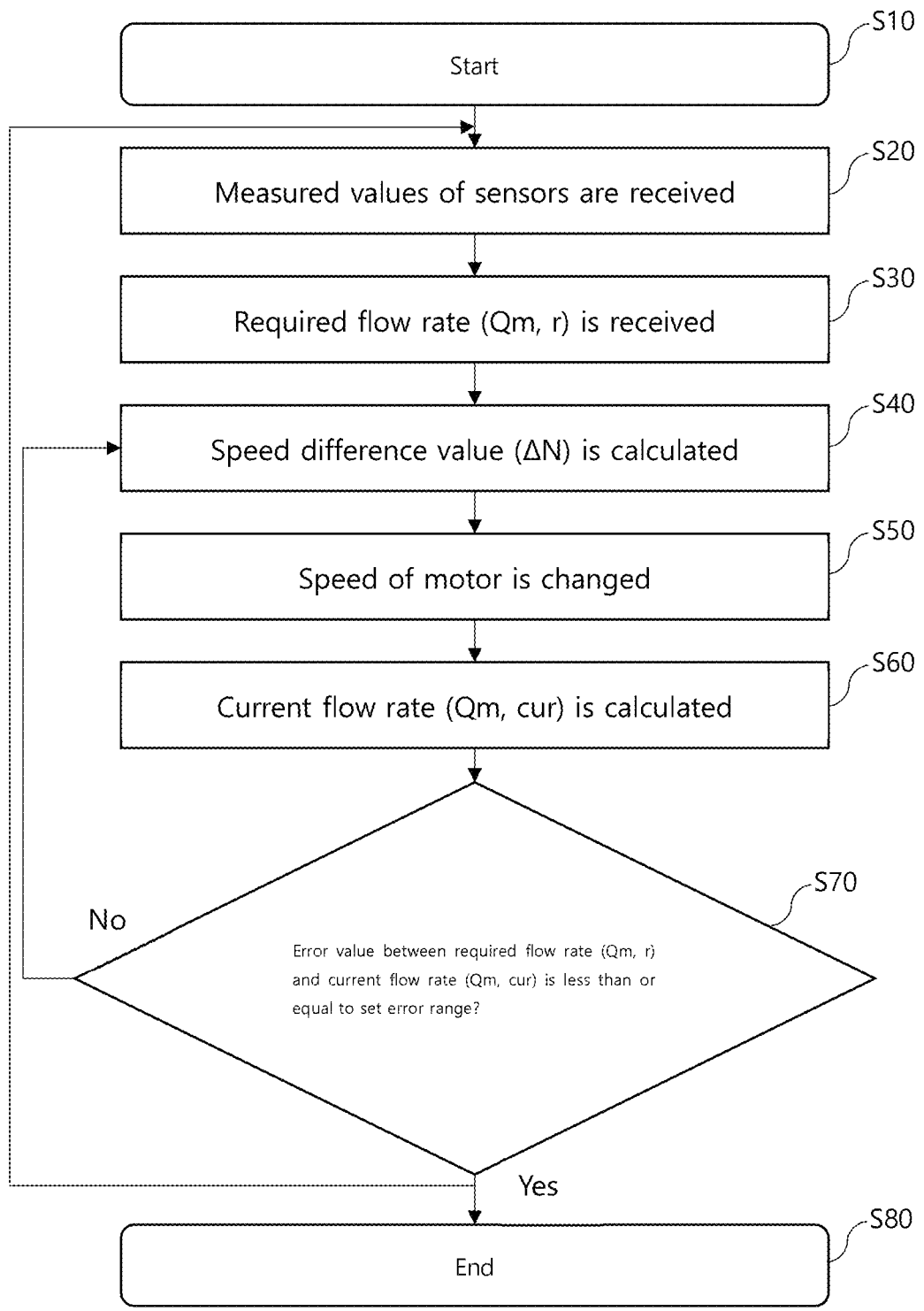

Referring to FIGS. 18A to 19, that is, the controller 800 receives the inputted value from the input device 810 and the measured values from the sensors 820, calculates the values in the manner mentioned above, controls the rotating speed of the motor 201 with the calculated values, and thus controls the flow rate of the mass supplied to the stack 110. In more specific, referring to FIG. 18A, if the required flow rate $Q_{m, r}$ is inputted by the worker, the controller 800 calculates the speed difference value $\Delta N$ based on the inlet and outlet pressures of the blower 200, the inlet temperature of the blower 200, and the rotating speed of the motor 201. After that, the controller 800 controls the rotating speed of the motor 201 by the speed difference value $\Delta N$ and thus controls the rotating speed of the blower 200. In this case, the controller 800 performs repeated calculation until the speed difference value $\Delta N$ is within the error range.

In the state where the pressure P1, temperature T1, and rotating speed N are sensed by the sensors 820 and the measured values are transmitted to the controller 800, FIG. 18B shows that the measured values of the sensors 820 are converted into current signals. If a signal $\Delta m_{REQ\_dot}$ is transmitted to the controller 800, the controller 800 calculates the speed difference value $\Delta N$ and generates a given signal, and the given signal is converted into $\Delta I$[mA] and transmitted to the motor 201. Next, the motor 201 transfers a torque of $\Delta \tau$[Nm]. Referring to FIG. 19, that is, if flow rate control is performed by the controller 800 at step S10, the controller 800 receives the measured values from the sensors 820 and stores the received values at step S20. Next, the controller 800 receives the inputted value, that is, required flow rate $Q_{m, r}$ from the input device 810 and stores the received value at step S30. After that, the controller 800 calculates the speed difference value $\Delta N$ based on the measured values and the input value at step S40. Next, the controller 800 changes the rotating speed of the motor 201 according to the speed difference value $\Delta N$ calculated at step S50, and then, the controller 800 calculates the current flow rate $Q_{m, cur}$ at step S60. After that, the controller 800 determines whether the error value % between the required flow rate $Q_{m, r}$ and the current flow rate $Q_{m, cur}$ is less than or equal to the set error value at step S70. In this case, if it is determined that the error value % between the required flow rate $Q_{m, r}$ and the current flow rate $Q_{m, cur}$ is not within the set error value, the controller 800 re-calculates the speed difference value $\Delta N$ at step S40. Contrarily, if it is determined that the error value % between the required flow rate $Q_{m, r}$ and the current flow rate $Q_{m, cur}$ is within the set error value, the controller 800 stops speed changing for the motor 201. After a given period of time has passed, next, the controller 800 re-starts the flow rate control and consistently controls the blower 200. In FIGS. 18A to 19, a main system represents the power generation system, and a signal m_dot represents mass flow rate $Q_m$.

Referring to FIG. 20, accordingly, if a performance map measured at 200° C. and 101.325 kPa is stored, for example, it is converted into a performance map on a condition of 500° C. through a conversion expression suggested therein. If the inlet and output pressure ratio of 1.1 and the rotating speed of 100% (139678 rpm) are obtained on the performance map on the condition of 500° C., the flow rate of about 500 lpm can be predicted.

That is, the required flow rate of the solid oxide fuel cell power generation system according to the present invention is controlled through the blower 200, and the recycle flow rate of the required flow rate is controlled through the fuel pump 410.

In conclusion, the unreacted fuel after the reaction of the fuel cell module 100 is recycled through the blower 200 and supplied to the anode, and the motor 201 used to operate the blower 200 is cooled by means of air cooling. The air used for cooling the blower 200 is recycled to the cathode of the fuel cell module 100, and the fuel pump 410 is controlled to set the recycle ratio. As a result, advantageously, the efficiency of the fuel cell module 100 can be improved.

As set forth in the foregoing, the solid oxide fuel cell power generation system according to the present invention is configured to allow the unreacted fuel after the reaction of the fuel cell module to be recycled through the blower and then supplied to the anode, configured to allow the motor used to operate the blower to be cooled by means of air cooling, configured to allow the air used for cooling the blower to be recycled to the cathode of the fuel cell module, and configured to control the fuel pump so as to set the recycle ratio, thereby improving the efficiency of the fuel cell module.

That is, the solid oxide fuel cell power generation system according to the present invention is provided with the air cooled high temperature blower having the foil-air bearings to thus allow the air heated after cooling the high temperature blower to be recycled to the cathode, thereby improving the power generation efficiency thereof.

Further, the solid oxide fuel cell power generation system according to the present invention converts the performance map in real time using the ambient temperature performance map and the measured data for the temperature and pressure at the high temperature operating point for the control of the high temperature blower, controls the rotating speed of the motor, and controls the recycle flow rate, so that as an orifice flow meter available at a high temperature is not used, a differential pressure loss can be reduced.

If the orifice flow meter is used, that is, a differential pressure is generated to cause the power for the high temperature blower to be additionally consumed, but the solid oxide fuel cell power generation system according to the present invention does not use the orifice flow meter, thereby improving the power generation efficiency thereof.

The technical configurations disclosed herein are not to be interpreted as limiting, but merely as a basis for the claims and as a representative basis for teaching one of ordinary skill in the art to variously employ the present invention in virtually any appropriately detailed structure.

The present invention may be modified in various ways and may have several exemplary embodiments. It is therefore intended that the scope of the invention be limited not by this detailed description, but rather by the claims appended hereto, and it should be understood that the invention covers all the modifications, equivalents, and replacements within the idea and technical scope of the invention.

What is claimed is:

1. A solid oxide fuel cell power generation system comprising:
   a fuel cell module comprising a stack having an anode and a cathode and generating electricity;
   a blower which blows a gaseous fuel to the anode of the fuel cell module;
   an air supplier which supplies air to the cathode of the fuel cell module through the blower such that the blower is cooled by the air supplied from the air supplier and the air configured to be supplied to the cathode is heated while passing through the blower;
   a fuel supplier which supplies the gaseous fuel to the blower;
   an air-blowing heat exchanger which heats the air whose temperature is raised after cooling the blower before the air is supplied to the cathode, using the air exhausted from the cathode; and
   at least one valve which selectively supplies a gas exhausted from the anode to the air-blowing heat exchanger or the blower such that the air-blowing heat exchanger heats, using the air exhausted from the cathode and the gas, the air whose temperature is raised after cooling the blower when the at least one valve supplies the gas to the air-blowing heat exchanger and the blower recycles at least a portion of an unreacted gaseous fuel contained in the gas exhausted from the anode to the fuel cell module when the at least one valve supplies the gas to the blower.

2. The solid oxide fuel cell power generation system according to claim 1, wherein the fuel cell module comprises a reformer adapted to perform a reforming reaction for the gaseous fuel supplied from the blower.

3. The solid oxide fuel cell power generation system according to claim 1, wherein the blower comprises:
   a motor disposed therein;
   a motor stator for supporting the motor;
   a shaft rotating with a power supplied from the motor;
   an impeller rotatably coupled to one end portion of the shaft to generate a flow of a fluid;
   a heat shield for blocking a heat generated by the rotation of the shaft;
   a volute for inducing a flow of the gaseous fuel supplied to an interior thereof from a linear direction to a centrifugal direction with respect to a rotary axis of the shaft; and
   a diffuser extended from the volute to restore a pressure of the gaseous fuel reduced by the volute.

4. The solid oxide fuel cell power generation system according to claim 3, wherein the shaft comprises a disc disposed on one side thereof to surround an outer peripheral surface thereof, and the blower comprises journal foil bearings for surrounding at least a portion of the outer peripheral surface of the shaft and thrust foil bearings for surrounding at least a portion of an outer peripheral surface of the disc.

5. The solid oxide fuel cell power generation system according to claim 3, wherein the blower further comprises a sealing member disposed between the shaft and the impeller.

6. The solid oxide fuel cell power generation system according to claim 1, wherein the air supplier comprises:
   a filter for filtering the air;
   an air blower for transferring the filtered air; and
   an air flow meter for measuring a flow rate of the air transferred to the blower from the air blower.

7. The solid oxide fuel cell power generation system according to claim 6, wherein the blower comprises:
   an air inlet allowing the air transferred by the air blower to be introduced thereinto; and
   an air outlet allowing the air introduced through the air inlet to be exhausted to an outside thereof, and
   the air transferred to an interior of the blower from the air inlet through the air blower cools the blower so that the air whose temperature is raised after cooling the blower is transferred to the fuel cell module.

8. The solid oxide fuel cell power generation system according to claim 1, wherein the fuel supplier comprises:
   a fuel pump for transferring the gaseous fuel;
   a fuel flow meter for measuring a flow rate of the gaseous fuel transferred to the blower through the fuel pump; and
   a desulfurizer for removing sulfur from the gaseous fuel transferred to the blower through the fuel pump.

9. The solid oxide fuel cell power generation system according to claim 8, wherein the at least one valve comprises:
   a first valve for controlling a flow of gaseous fuel supplied to the blower through the fuel pump; and
   a second valve for controlling a flow of the unreacted gaseous fuel toward the air-blowing heat exchanger or the blower.

10. The solid oxide fuel cell power generation system according to claim 1, further comprising a catalyst for removing harmful components existing in the air in a process where after the air and the gaseous fuel that are supplied to the fuel cell module have been reacted with each other in the fuel cell module, the air and the gaseous fuel are exhausted.

11. The solid oxide fuel cell power generation system according to claim 1, further comprising a heat collector for collecting waste heat in the air and the gaseous fuel in a process where after the air and the gaseous fuel that are supplied to the fuel cell module have been reacted with each other in the fuel cell module, the air and the gaseous fuel are exhausted.

12. The solid oxide fuel cell power generation system according to claim 11, wherein the heat collector comprises:
- a heat-collecting heat exchanger for performing heat exchange between the air and the gaseous fuel when the air and the gaseous fuel are exhausted after reacted with each other in the fuel cell module; and
- a vent for exhausting the air and gaseous fuel whose heat exchange is completed in the heat-collecting heat exchanger.

13. The solid oxide fuel cell power generation system according to claim 12, wherein the heat collector comprises:
- a low temperature fluid supplier for supplying a low temperature fluid to the heat-collecting heat exchanger; and
- a high temperature fluid supplier for supplying a high temperature fluid produced after the fluid supplied from the low temperature fluid supplier has been heated by the heat-collecting heat exchanger to the outside thereof.

14. The solid oxide fuel cell power generation system according to claim 1, further comprising a controller for controlling the blower and the fuel supplier, the fuel supplier having a fuel pump adapted to supply the gaseous fuel to the blower, and the controller controlling the blower and the fuel pump to control a ratio of the gaseous fuel to the unreacted gaseous fuel supplied to the fuel cell module from the blower.

15. The solid oxide fuel cell power generation system according to claim 14, wherein the controller comprises an input device for inputting the ratio of the gaseous fuel to the unreacted gaseous fuel supplied to the fuel cell module from the blower.

16. The solid oxide fuel cell power generation system according to claim 15, wherein the controller controls the fuel pump according to a recycle ratio received through the input device to allow a quantity of gaseous fuel supplied to the blower to be controlled.

17. The solid oxide fuel cell power generation system according to claim 16, wherein the recycle ratio is set to 50 to 70%.

* * * * *